United States Patent
Terashima

(10) Patent No.: US 9,195,087 B2
(45) Date of Patent: Nov. 24, 2015

(54) DISPLAY DEVICE AND TELEVISION DEVICE

(71) Applicant: Sharp Kabushiki Kaisha, Osaka-shi, Osaka (JP)

(72) Inventor: Kentaro Terashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/387,905

(22) PCT Filed: Apr. 24, 2013

(86) PCT No.: PCT/JP2013/062021
§ 371 (c)(1),
(2) Date: Sep. 25, 2014

(87) PCT Pub. No.: WO2013/179828
PCT Pub. Date: Dec. 5, 2013

(65) Prior Publication Data
US 2015/0049255 A1 Feb. 19, 2015

(30) Foreign Application Priority Data

May 29, 2012 (JP) .................................. 2012-122110

(51) Int. Cl.
*G02F 1/1333* (2006.01)
*H04N 5/74* (2006.01)
(Continued)

(52) U.S. Cl.
CPC ........ *G02F 1/133308* (2013.01); *G02B 6/0073* (2013.01);
(Continued)

(58) Field of Classification Search
CPC .. G02B 6/0055; G02B 6/0073; G02B 6/0085; G02B 6/0091; G02F 1/133308; G02F 2001/133314; G02F 2001/13332; G09G 3/3406; G09G 2300/023; G09G 2300/0426; H04N 5/7408
See application file for complete search history.

(56) References Cited

U.S. PATENT DOCUMENTS 8,888,348 B2 * 11/2014 Terashima ........ G02F 1/133615
362/608

(Continued)

FOREIGN PATENT DOCUMENTS

JP 2008-027736 A 2/2008

*Primary Examiner* — Stephen F Husar
(74) *Attorney, Agent, or Firm* — Keating & Bennett, LLP

(57) ABSTRACT

A display device includes a chassis 14, a frame 13, a photo curable resin member 30a, 30b, and a heat dissipation member 19. The frame 13 includes a portion supporting the light guide plate 16 from a side of a light exit surface 16a such that the light guide plate 16 slides. The photo curable resin member 30a, 30b is arranged between an LED board 18 and the light guide plate 16 and fixed thereto to maintain a distance between a mount surface 18a of the LED board 18 and a light entrance surface 16b of the light guide plate 16. The heat dissipation member 19 having a heat dissipation property is arranged apart from the frame 13 and includes a board attachment portion 19a to which the LED board 18 is attached and a plate-like portion 19b. The plate-like portion 19b extends from the board attachment portion 19a toward the light guide plate 16. The plate-like portion 19b is a plate spring including a portion being elastically in contact with a second bottom plate 14b.

14 Claims, 15 Drawing Sheets

(51) Int. Cl.
*G09G 3/34* (2006.01)
*F21V 8/00* (2006.01)

(52) U.S. Cl.
CPC ........... *G02B 6/0085* (2013.01); *G02B 6/0091* (2013.01); *G09G 3/3406* (2013.01); *H04N 5/7408* (2013.01); *G02B 6/0055* (2013.01); *G02F 2001/13332* (2013.01); *G02F2001/133314* (2013.01); *G09G 2300/023* (2013.01); *G09G 2300/0426* (2013.01)

(56) References Cited

U.S. PATENT DOCUMENTS

| | | | |
|---|---|---|---|
| 2009/0097277 A1* | 4/2009 | Iwasaki | G02B 6/0091 362/628 |
| 2014/0125922 A1* | 5/2014 | Terashima | G02B 6/0011 349/65 |
| 2014/0340586 A1* | 11/2014 | Terashima | G02B 6/0055 348/790 |

* cited by examiner

DISPLAY DEVICE AND TELEVISION DEVICE

TECHNICAL FIELD

The present invention relates to a display device and a television device.

BACKGROUND ART

In recent years, displays in image display devices, such as television devices, are being shifted from conventional cathode-ray tube displays to thin displays, such as liquid crystal displays and plasma displays. With the thin displays, thicknesses of the image display devices can be decreased. Liquid crystal panels do not emit light. Therefore, liquid crystal display devices including liquid crystal panels require backlight devices. An edge-light type backlight device is known as one example of the backlight device. The edge-light type backlight device includes a light guide plate with a light entrance surface on the side and light sources such as LEDs arranged closer to the side of the light guide plate.

In the edge-light type backlight device, the light guide plate may move in its plate surface direction due to vibrations of the light guide plate or a fall of the backlight device. This may change a distance between the light guide plate and the light source. If the distance between the light guide plate and the light source changes, an optical design may not remain preferable. For such a reason, in the edge-light type backlight device, it is required to provide a configuration that causes less or no movement of the light guide plate and keeps a constant distance between the light guide plate and the light source.

Patent document 1 discloses a backlight unit including a light guide plate held in a chassis. In Patent document 1, the light guide plate is less likely to move in its plate surface direction due to the vibrations thereof. In the backlight unit, ribs having spring properties are disposed between the light guide plate and side plates of the chassis to maintain the distance between the light guide plate and the chassis. In this configuration, the light guide plate is less likely to move in its plate surface direction because of an elastic force of the ribs.

RELATED ART DOCUMENT

Patent Document

Patent Document 1: Japanese Unexamined Patent Application Publication No. 2008-27736

Problem to be Solved by the Invention

In the backlight unit disclosed in Patent Document 1, the light guide plate is less likely to move. However, because the light guide plate and the light source are not fixed to each other, if the light guide plate vibrates or the backlight unit falls, a light entrance surface of the light guide plate may collide with the light source. The collision of the light entrance surface of the light guide plate and the light source may damage the light source.

In response to recent demands for reductions in production cost and in thickness, a configuration without a cabinet that is made of synthetic resin and serves as an exterior member of a liquid crystal display may be considered. In a liquid crystal display device without the cabinet, a frame may hold a liquid crystal panel and may constitute an exterior member of the liquid crystal display unit. The frame is a hands-on portion. In general, a light source board is directly attached to the frame or indirectly attached to the frame with a heat dissipation member in between. Therefore, in the liquid crystal display device without the cabinet, heat generated on the light source board is easily transferred to the frame and this increases a temperature of the frame. Since the frame is the hands-on portion, an excessive temperature increase of the frame is a problem.

DISCLOSURE OF THE PRESENT INVENTION

A technology disclosed herein was made in view of the above circumstances. An object is to provide a cabinet-less lighting device in which a distance between a light guide plate and a light source is less likely to change even if the light guide plate vibrates. Further, an excessive temperature increase of a hands-on frame can be suppressed.

Means for Solving the Problem

A technology disclosed herein relates to a lighting display including a light source, a display panel, a light guide plate, a light source board, a chassis, a frame, a fixing member, and a heat dissipation member. The display panel is configured to provide a display using light from the light source. The light guide plate is arranged on an opposite side from a display surface side of the display panel so as to overlap the display panel and configured to direct the light from the light source toward a display panel side. The light guide plate includes at least a side surface and a plate surface. The at least the side surface is a light entrance surface. The plate surface faces the display panel. The plate surface is a light exit surface. The light source board has one plate surface on the light source is arranged. The chassis has at least a bottom plate and arranged on an opposite side of the light guide plate from the display panel side. The frame is arranged on the display surface side of the display panel and holds the display panel, the light source, and the light guide plate between the frame and the chassis. The frame includes a portion that supports the light guide plate from a side of the light exit surface such that the light guide plate slides. The fixing member is provided between the light source board and the light guide plate and fixed to the light source board and the light guide plate to maintain a distance between the one plate surface of the light source board and the light entrance surface of the light guide plate. The heat dissipation member having a heat dissipation property is arranged apart from the frame. The heat dissipation member includes an attachment portion and a plate-like portion. The attachment portion is attached on another plate surface of the light source board. The plate-like portion having a plate-like shape extends from the attachment portion toward the light guide plate. The plate-like portion is a plate spring and includes a portion being elastically in contact with the bottom plate.

According to the lighting device, the light source and the light guide plate are fixed to each other with the fixing member. Therefore, the distance between the light source and the light guide plate remains constant. Further, the light guide plate, the light source, the light source board, and the heat dissipation member are connected to one another. The light guide plate is supported by apart of the frame from the light exit surface side such that the light guide plate slides. On the other hand, the plate-like portion of the heat dissipation member is elastically in contact with the bottom plate and supported thereby while receiving a reaction force from the bottom plate. The unit of the light guide plate, the light source, the light source board, and the heat dissipation member is supported by the frame and the chassis from two sides of the light guide plate with respect to its thickness direction. The unit is held so as to slide (the plate-like portion is just in contact with the bottom plate on its chassis side) in the thickness direction of the light source board (an arrangement direction in which the light guide plate, the light source, and the light source board are arranged). In this configuration, if the light guide plate vibrates, the unit including the heat dissipation member the light guide plate slides in the thickness direction of the light source board while the distance between the light source and the light entrance surface of the light guide plate remains constant. The heat dissipation member slides with its contact portion that is in contact with the bottom plate. The light guide plate slides with the portion of the light entrance surface supported by the frame. Therefore, the vibration of the light guide plate is absorbed. Further, the heat dissipation member is apart from the frame while being in contact with the bottom plate portion of the chassis. Therefore, a large proportion of heat transferred from the light source to the heat dissipation member is transferred to the bottom plate of the chassis. The heat is then effectively released to the outside of the display device. As described above, in the display device without a cabinet, the distance between the light guide plate and the light source is less likely to change even if the light guide plate vibrates. Further, an excessive temperature increase of the hands-on frame can be suppressed.

The distance between the one plate surface of the light source board and the light entrance surface of the light guide plate may be maintained by the fixing member such that a light-emitting surface of the light source is in contact with the light entrance surface. In this configuration, the light source is in contact with the light entrance surface of the light guide plate. If the light entrance surface of the light guide plate is moved toward the light source by receiving a force greater than a force with which the fixing member fixes the light guide plate, the light source is less likely to be damaged by a contact with the light entrance surface of the light guide plate.

The fixing member may be made of a photo curable resin.

In this configuration, during production of the display device, the photo curable resin as the fixing member is arranged on the one surface of the light source board. The light source board is attached to the light entrance surface of the light guide plate via the photo curable resin, and the photo curable resin is cured with light. With this configuration, the light source board is easily fixed to the light guide plate.

The fixing member may be a fitting portion extending from the light source board toward the light guide plate and having a hook-like shape. The fitting portion may be fitted in a portion of the light guide plate.

In this configuration, during production of the display device, the fitting portion of the light source board is engaged with the light guide plate. Therefore, the light guide plate is easily fixed to the light source board.

The portion of the plate-like portion that is in contact with the bottom plate may be provided with a lubricant agent.

With the lubricant agent, a friction coefficient in the contact portion between the plate-like portion and the bottom plate portion decreases. Therefore, the plate-like portion is more likely to slide if vibrations occur in the light guide plate. This can effectively absorb the vibrations of the light guide plate.

The plate-like portion may include at least a portion including the portion that is in contact with the bottom plate. The at least the portion may have a curved surface curved so as to be convex toward the bottom plate.

In this configuration, the curved surface of the plate-like portion is in contact with the bottom plate. In comparison with a case in which the plate-like portion has a flat surface and is in contact with the bottom plate with the flat surface, a friction coefficient between the plate-like portion and the bottom plate is smaller in this configuration. Therefore, the plate-like portion is more likely to slide if vibration occurs in the light guide plate. This can effectively absorb the vibration of the light guide plate.

The plate-like portion may extend at an angle from a connection portion of the attachment portion so as to be away from the light guide plate and further extends at an angle toward the light guide plate.

In this configuration, the plate-like portion is angled away from the light guide plate. If the above configuration is compared with a configuration in which the plate-like portion directly extends from the connection portion toward the light guide plate, the plate-like portion and the bottom plate are in contact to each other away from the light guide plate. With this configuration, a contact area between the second plate-like portion 519b and the second bottom-plate portion 514b increases. Therefore, heat dissipation effect of the heat dissipation member 519 can be enhanced.

The one plate surface of the light source board may have a rectangular shape, and the fixing member may be provided to end portions of the one plate surface of the light source board with respect to a short-side direction thereof.

In this configuration, the fixing member does not block light emitted from the light source and traveling toward the light entrance surface of the light guide plate. Further, fixing member is arranged at a different position. Therefore, the light source board and the light guide plate are securely fixed to each other by the fixing member.

The light source board may have a rectangular shape, and the fixing member may be provided substantially over in a long-side direction of each of the one plate surface and the light entrance surface.

In this configuration, as areas of the light source board and the light guide plate that are fixed by the fixing member increase, the light source board and the light guide plate are further securely fixed to each other.

The fixing member may be black in color having a light blocking property.

With this configuration, a part of rays of light exiting the light source and directly traveling toward the display panel side is blocked by the fixing member. Therefore, the rays of light emitted from the light source are less likely to directly enter an end surface of the display panel, and uneven brightness on the display surface that may be caused thereby can be reduced.

The light guide plate may have a pair of side surfaces on opposite sides as the light entrance surface.

In this configuration, the light source boards are fixed on the respective opposite side-surfaces of the light guide plate. Therefore, the light guide plate are sandwiched between the light source boards, and the unit including the light guide plate, the light source boards, and the heat dissipation members connected to one another slides. Therefore, this invention can be applied to a configuration in which the light sources are arranged not only the one side surface of the light guide plate but also on the opposite side-surfaces of the light guide plate.

One of the light guide plate and the frame may include a protrusion that protrudes toward the other one of the light guide plate and the frame. The other one of the light guide plate and the frame may include a recess located opposite the protrusion. The recess may open to the protrusion such that the protrusion fits therein.

In this configuration, since the positioning protrusion is fitted to the positioning recess, the light guide plate can be positioned between the frame and the chassis in the plate surface direction of the light guide plate. Therefore, while a configuration in which the light guide plate is positioned between the frame and the chassis is achieved, a configuration in which the distance between the light guide plate and the light source does not change even if the light guide plate vibrates is achieved.

In the technology disclosed herein, a display device including a liquid crystal panel using liquid crystals as the display panel has novelty and utility. Further, a television device including the above display device has novelty and utility.

Advantageous Effect of the Invention

According to the technology disclosed herein, in the lighting device without a cabinet, the distance between the light guide plate and the light source is less likely to change even if the light guide plate vibrates. Further, an excessive temperature increase of the hands-on frame can be suppressed.

MODE FOR CARRYING OUT THE INVENTION

<First Embodiment>

A first embodiment will be described with reference to drawings. According to this embodiment, a liquid crystal display device (an example of a display device) 10 will be described. X-axis, Y-axis and Z-axis are indicated in some drawings. The axes in each drawing correspond to the respective axes in other drawings. The Y-axis direction corresponds to a vertical direction and the X-axis direction corresponds to a horizontal direction. An upper side and a lower side are based on the vertical direction unless otherwise specified.

Figure 1:
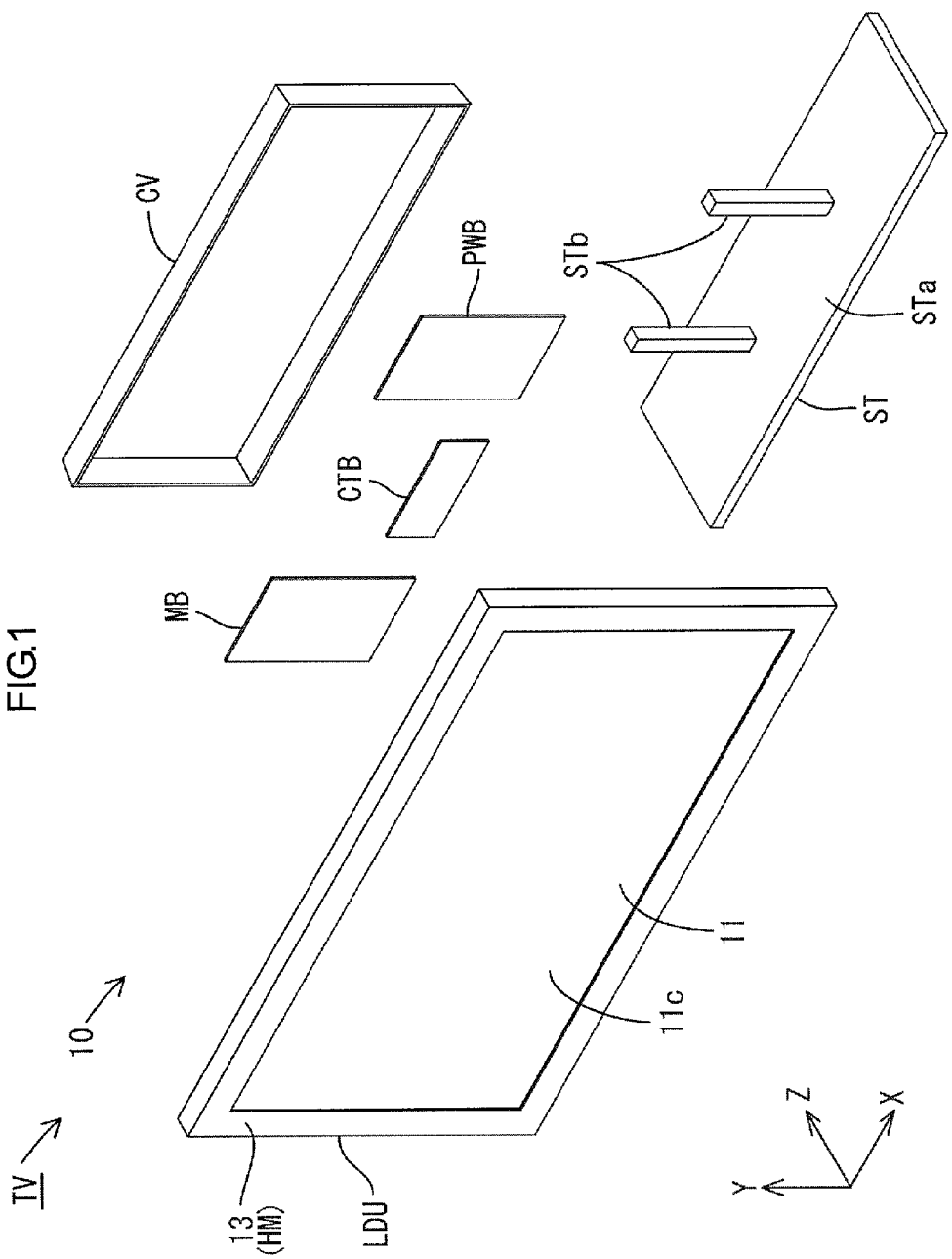
FIG. 1 is an exploded perspective view of a general configuration of a television device TV and a liquid crystal display unit LDU according to a first embodiment.
Figure 2:
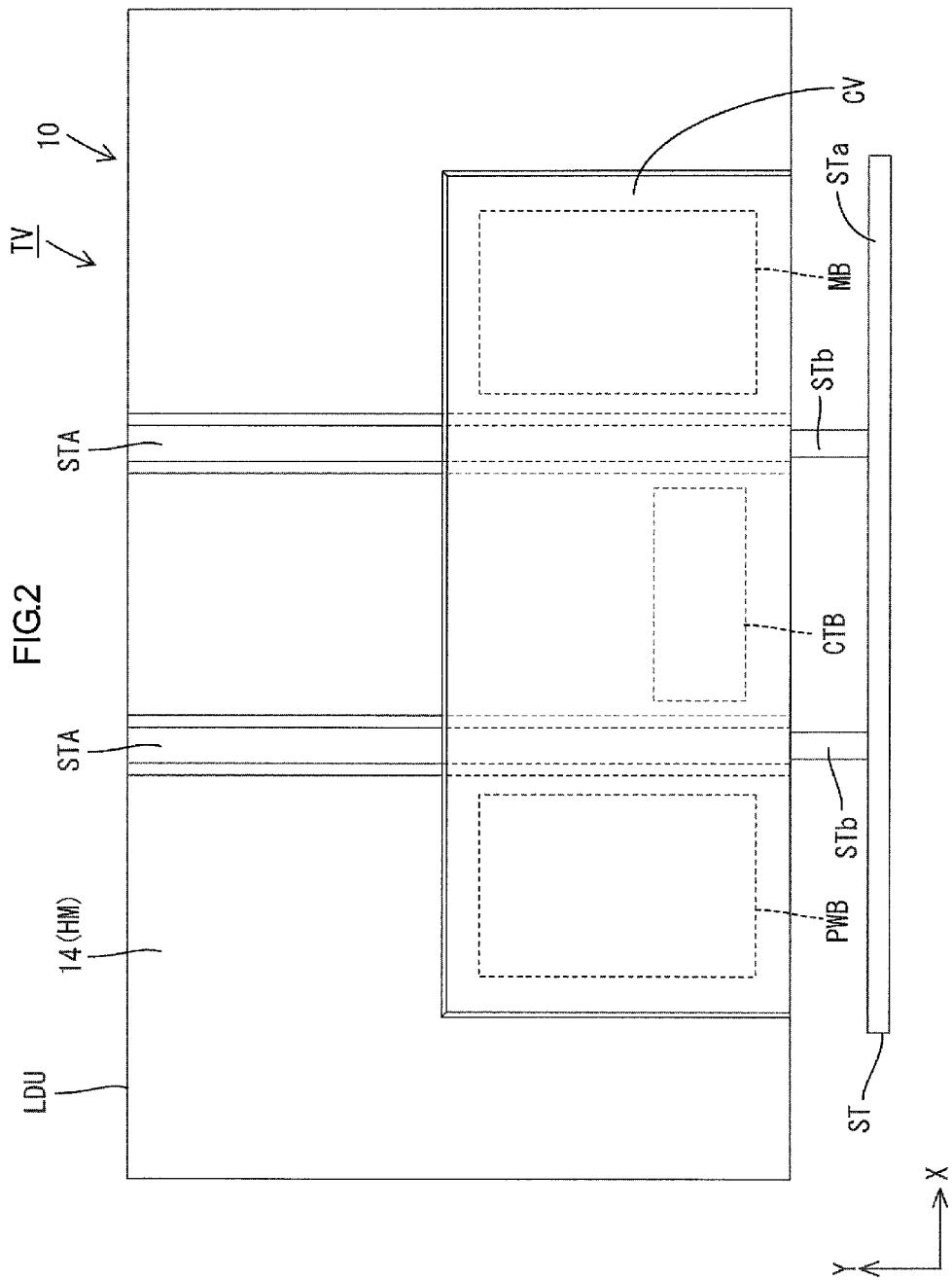
FIG. 2 is a rear view of the television device TV and a liquid crystal display device 10.

A television device TV includes a liquid crystal display unit LDU, boards PWB, MB, and CTB, a cover CV, and a stand ST. The boards PWB, MB, and CTB are attached to a rear surface (a back surface) of the liquid crystal display unit LDU. The cover CV is attached to the rear surface of the liquid crystal display unit LDU so as to cover the boards PWB, MB, and CTB. The stand ST holds the liquid crystal display unit LDU such that a display surface of the liquid crystal display unit LDU extends in the vertical direction (the Y-axis direction). The liquid crystal display device 10 according to this embodiment has the same configuration as the above-described television device TV except for at least a component for receiving television signals (e.g. a tuner included in a main board MB). As illustrated in FIG. 2, the liquid crystal display unit LDU has a landscape rectangular overall shape (rectangular and longitudinal). The liquid crystal display unit LDU includes a liquid crystal panel 11 as a display panel and a backlight device 12 as a light source. The liquid crystal panel 11 and the backlight device 12 are collectively held by a frame 13 and a chassis 14. The frame 13 and the chassis 14 are external members that provide an external configuration of the liquid crystal display device 10. The chassis 14 in this embodiment is one of the components to form the exterior and a part of the backlight device 12.

Configurations of the liquid crystal display device 10 on a rear surface side will be described. As illustrated in FIG. 2, stand fitting members STA are attached to a rear surface of the chassis 14 that provides an external configuration of the back of the liquid crystal display device 10. The stand fitting members STA are spaced away from each other in an X-axis direction and each extend along the Y-axis direction. Each stand fitting member STA has a cross section that corresponds to a cross section of a channel beam and opens to the chassis 14. A space is provided between the stand fitting member STA and the chassis 14. Support portions STb included in the stand ST are inserted in the respective stand fitting members STA. The space provided in the stand fitting member STA is configured to be a path through which wiring members (e.g. electric wires) which are connected to an LED board (an example of a light source board) 18 are passed. The LED board 18 is included in the backlight device 12. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand fitting members STA in the X-axis direction. A component storage space is provided between the cover CV and the chassis 14 such that the boards PWB, MB, and CTB, which will be described next, are stored therein.

As illustrated in FIG. 2, the liquid crystal display device 10 includes a power source board PWB, a main board MB, and a control board CTB as the boards PWB, MB, and CTB. The power source board PWB will be referred to as a power supply of the liquid crystal display device 10 and supplies drive power to the other boards MB and CTB and LEDs (an example of light sources) 17 included in the backlight device 12. Namely, the power source board PWB also serves as "an LED drive board that drives the LEDs 17". The main board MB includes at least a tuner and an image processor, which are not illustrated. The tuner is configured to receive television signals. The image processor performs image processing on the received television signals. The main board MB is configured to output the processed image signals to the control board CTB, which will be described next. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which is sent from the main board, to driving signals for liquid crystals and to supply the driving signals to the liquid crystal panel 11.

Figure 3:
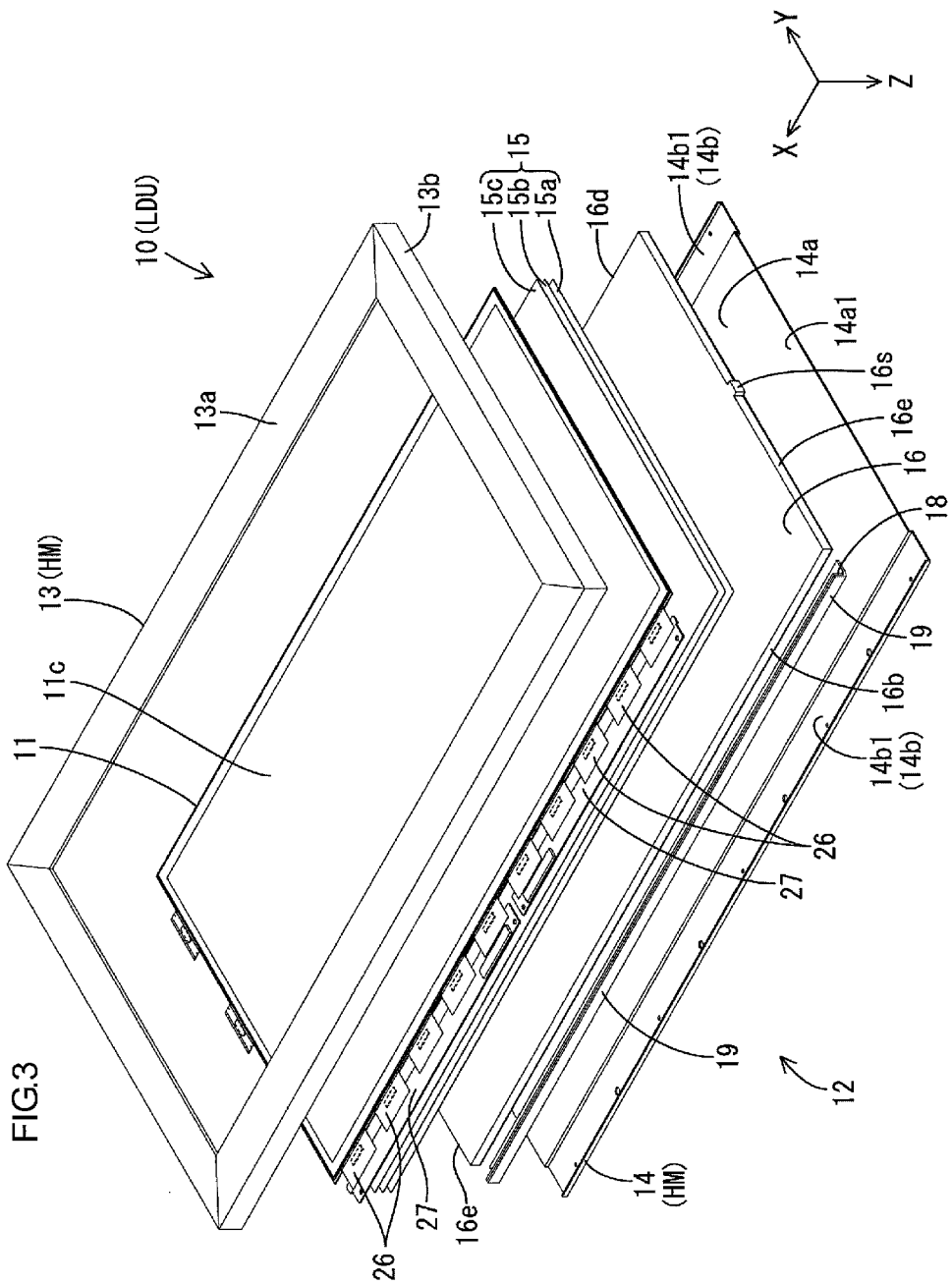
FIG. 3 is an exploded perspective view of a general configuration of the liquid crystal display unit LDU of the liquid crystal display device 10.

As illustrated in FIG. 3, main components of the liquid crystal display unit LDU included in the liquid crystal display device 10 are arranged in a space provided between the frame 13, which constitutes a front exterior, and the chassis 14, which constitutes a rear exterior. The main components arranged in the frame 13 and the chassis 14 include at least the liquid crystal panel 11, an optical member 15, and an integral unit UU. The integral unit UU includes a light guide plate 16, photo-curable resin members (an example of fixing members) 30, the LEDs 17, the LED board 18, and a heat dissipation member 19. Each of the components is connected to one another to provide the integral unit UU. The liquid crystal panel 11, the optical member 15, and the light guide plate 16 of the integral unit UU are placed on top of one another and held between the front frame 13 and the rear chassis 14. The optical member 15, the integral unit UU, and the chassis 14 constitute the backlight unit 12. In other words, the above-described liquid crystal display unit LDU without the liquid crystal panel 11 and the frame 13 is the backlight unit 12. The LED board 18 of the integral unit UU is arranged in the frame 13 and the chassis 14 so as to face one of long-side end surfaces of the light guide plate 16. The LED board 18 includes a plate surface (referred to as a mount surface 18*a*) which faces the light guide plate 16. The LEDs (an example of light sources) 17 as light sources are mounted on the mount surface 18*a*. On the other hand, the heat dissipation member (a heat spreader) 19 is attached to a plate surface of the LED board 18 opposite from the plate surface facing the light guide plate 16. The photo-curable resin 30 is provided between the mount surface 18*a* of the LED board 18 and an end surface of the light guide plate 16. The LED board 18 and the light guide plate 16 are fixed to each other with the photo curable resin 30. Each component will be described next.

As illustrated in FIG. 3, the liquid crystal panel has a landscape rectangular shape (rectangular and longitudinal) in a plan view and includes a pair of glass substrates 11*a* and 11*b* (refer to as FIG. 4) and liquid crystals. The substrates 11*a* and 11*b* each having high light transmissivity are bonded together with a predetermined gap therebetween. The liquid crystals are sealed between the substrates 11*a* and 11*b*. On one substrate (an array substrate) 11*b*, switching elements (e.g. TFTs), pixel electrodes, and an alignment film are arranged. The switching elements are connected to gate lines and source lines that are arranged perpendicular to each other. The pixel electrodes are connected to the switching elements. On the other substrate (a CF substrate) 11*a*, color filters, a counter electrode, and an alignment film are arranged. The color filters include red (R), green (G), and blue (B) color portions that are arranged in a predetermined arrangement. The liquid crystal panel 11 is placed on a front side of the optical member 15, which will be described later. A rear surface of the liquid crystal panel 11 (an outer surface of a polarizing plate on the rear side) is fitted to the optical member 15 with minimal gaps therebetween. Therefore, dust is less likely to enter between the liquid crystal panel 11 and the optical member 15. The liquid crystal panel 11 includes a display surface 11*c*. The display surface 11*c* includes a display area and a non-display area. The display area is an inner area of a screen in which images are displayed. The non-display area is an outer area of the screen around the display area with a frame-like shape. The liquid crystal panel 11 is connected to the control board CTB via a driver for driving the liquid crystals and flexible boards 26. The liquid crystal panel 11 displays an image in the display area of the display surface 11*c* based on signals sent from the control board CTB. The polarizing plates, which are not illustrated, are arranged on outer sides of the substrates 11*a* and 11*b*.

As illustrated in FIG. 3, similar to the liquid crystal panel 11, the optical member 15 has a landscape rectangular shape in a plan view and has the same size (a short-side dimension and a long-side dimension) as the liquid crystal panel 11. The optical member 15 is placed on the front side (a light exit side) of the light guide plate 16, which will be described later, and sandwiched between the light guide plate 16 and the liquid crystal panel 11. The optical member 15 includes three sheets that are placed on top of one another. Specifically, a diffuser sheet 15*a*, a lens sheet (a prism sheet) 15*b*, and a reflecting type polarizing sheet 15*c* are placed on top of one another in this sequence from the rear side (the light guide plate 16 side). Each of the three sheets 15*a*, 15*b*, and 15*c* has the substantially same size in a plan view.

Next, configurations of the frame 13 and the chassis 14 that constitute the exteriors and a holding member HM will be described. The frame 13 and the chassis 14 are made of metal such as aluminum. Therefore, the mechanical strength (rigidity) and thermal conductivity of the frame 13 and the chassis 14 are higher than those of a frame and a chassis made of synthetic resin. As illustrated in FIG. 3, the frame 13 and the chassis 14 sandwich and hold the liquid crystal panel 11, the optical member 15, and the integral unit UU, which are placed on top of the other, from the front side and the rear side.

As illustrated in FIG. 3, the frame 13 has a landscape rectangular shape so as to surround the display area in the display surface 11*c* of the liquid crystal panel 11. The frame 13 includes a panel holding portion 13*a* and a sidewall portion 13*b*. The panel holding portion 13*a* is parallel to the display surface 11*c* of the liquid crystal panel 11 and presses the liquid crystal panel 11 from the front side. The sidewall 13*b* protrudes from an outer peripheral portion of the panel holding portion 13*a* toward the rear side. The panel holding portion 13*a* and the sidewall 13*b* form an L-like shape in a cross section. The panel holding portion 13*a* form a landscape-rectangular and frame-like shape that correspond to an outer peripheral portion (the non-display area, a frame-like portion) of the liquid crystal panel 11. The panel holding portion 13*a* presses a substantially entire area of the outer peripheral portion of the liquid crystal panel 11 from the front side. The panel holding portion 13*a* has a width that is large enough to cover not only the outer peripheral portion of the liquid crystal panel 11 but also an outer peripheral portion of the optical member 15, an outer peripheral portion of the light guide plate 16, the LED board 18, and the heat dissipation member 19 from the front side. The outer peripheral portion of the optical member 15, the light guide plate 16, the LED board 18, and the heat dissipation member 19 are located on the outer side with respect to the outer peripheral portion of the liquid crystal panel 11 in a radiation direction. Similar to the display surface 11*c* of the liquid crystal panel 11, a front exterior surface (a surface opposite to the surface facing the liquid crystal panel 11) of the panel holding portion 13a is seen from the front side of the liquid crystal display device 10. The panel holding portion 13a constitutes a front exterior of the liquid crystal display device 10 together with the display surface 11c of the liquid crystal panel 11. The sidewall 13b has a substantially rectangular hollow shape and protrudes from the outer peripheral portion (specifically, an outer peripheral end portion) of the panel holding portion 13a toward the rear side. The sidewall 13b entirely surrounds the liquid crystal panel 11, the optical member 15, the light guide plate 16, the LED board 18, and the heat dissipation member 19, which are arranged in the space between the frame 13 and the chassis 14, in a peripheral direction thereof. The sidewall 13b entirely surrounds the chassis 14 which is on the rear side. An outer surface of the sidewall 13b that extends along an outer peripheral surface of the liquid crystal display device 10 can be seen from the outside of the liquid crystal display device 10. Therefore, the outer surface of the sidewall 13b constitutes a top surface, a bottom surface, and side surfaces of the liquid crystal display device 10.

Figure 5:
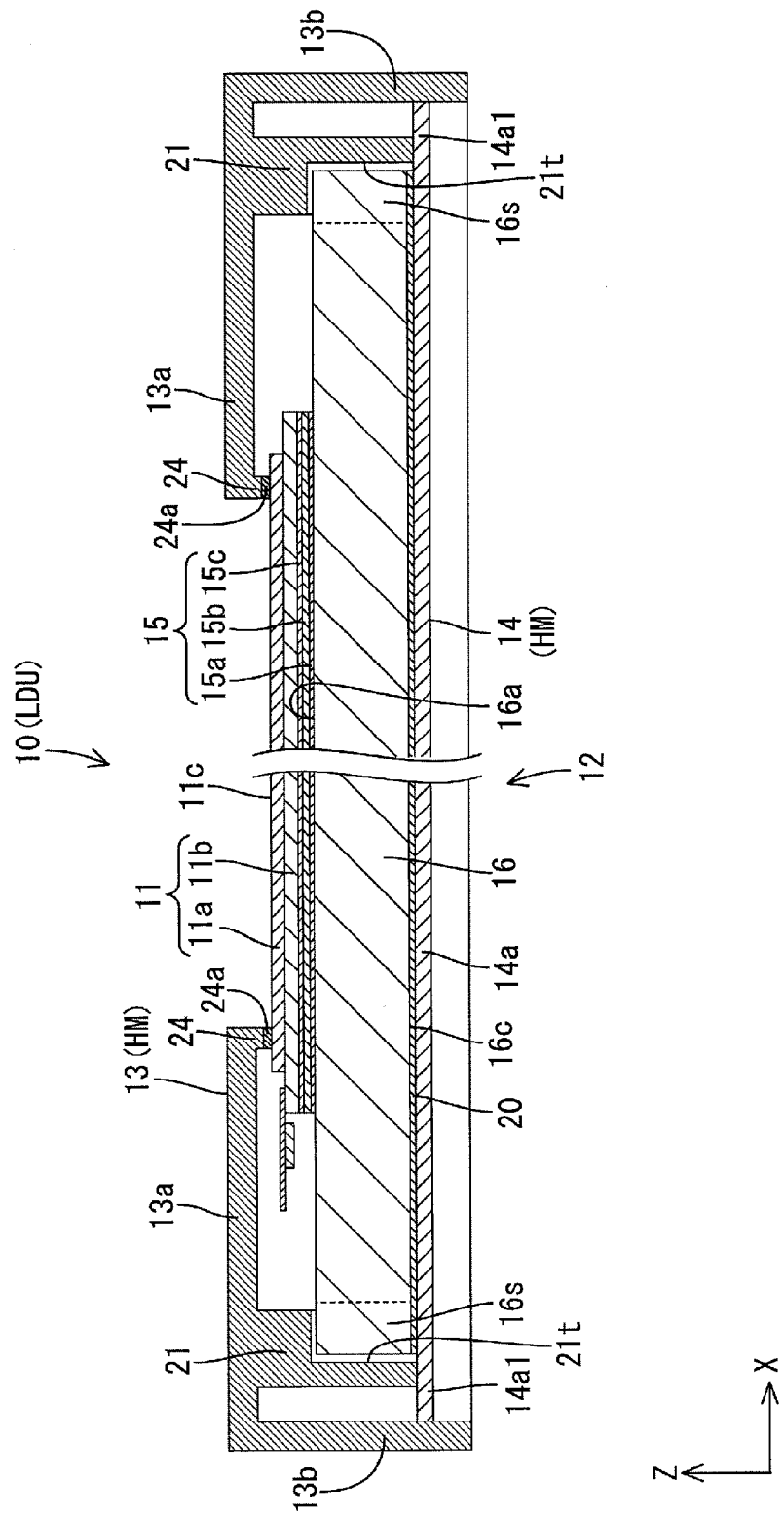
FIG. 5 is a cross-sectional view of the liquid crystal display device 10 taken along a long-side direction thereof.
Figure 9:
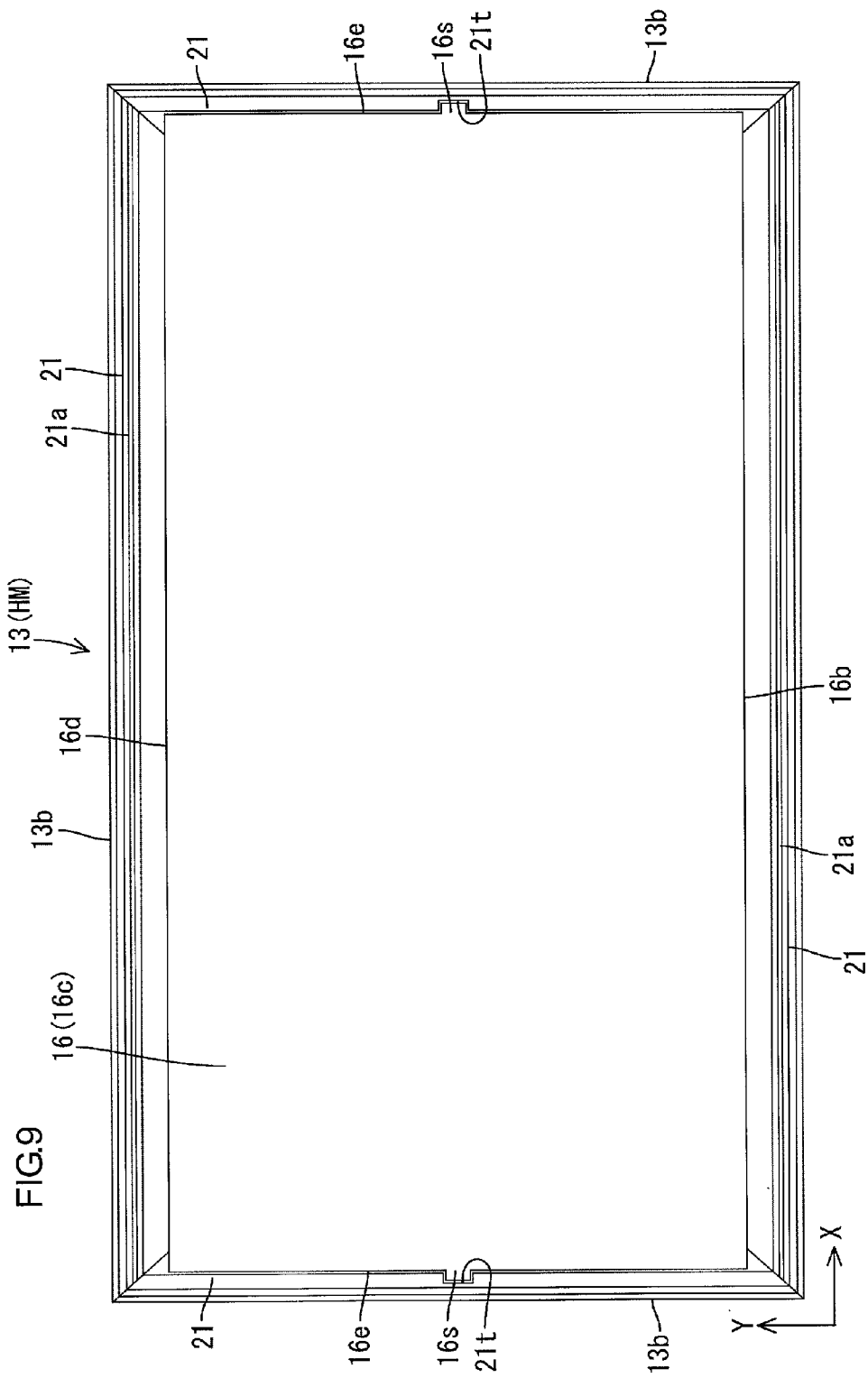
FIG. 9 is a plan view of a frame 13 and a light guide plate 16 arranged therein seen from a rear side.

As illustrated in FIGS. 5 and 9, the frame 13 includes screw attachment portions 21. The screw attachment portions 21 include positioning recesses 21t on inner sides thereof. Each positioning recess 21t is located corresponding to a positioning protrusion 16s of the light guide plate 16, which will be described later. The positioning recess 21t is open to the positioning protrusion 16s and recessed so as to form a shape that corresponds to peripheral surfaces of the positioning protrusion 16s. The positioning recess 21t is dimensioned such that the positioning protrusion 16s can be fitted into the positioning recess 21t with a slight gap therebetween. The light guide plate 16 is arranged in the frame 14 with the positioning protrusions 16s fitted in the positioning recesses 21t. In this configuration, the positioning protrusions 20s and the positioning recesses 21t fit to each other. Therefore, the light guide plate 16 is positioned with respect to a plate surface direction (an X-Y plane direction) of the light guide plate 16 between the frame 13 and the chassis 14.

Figure 4:
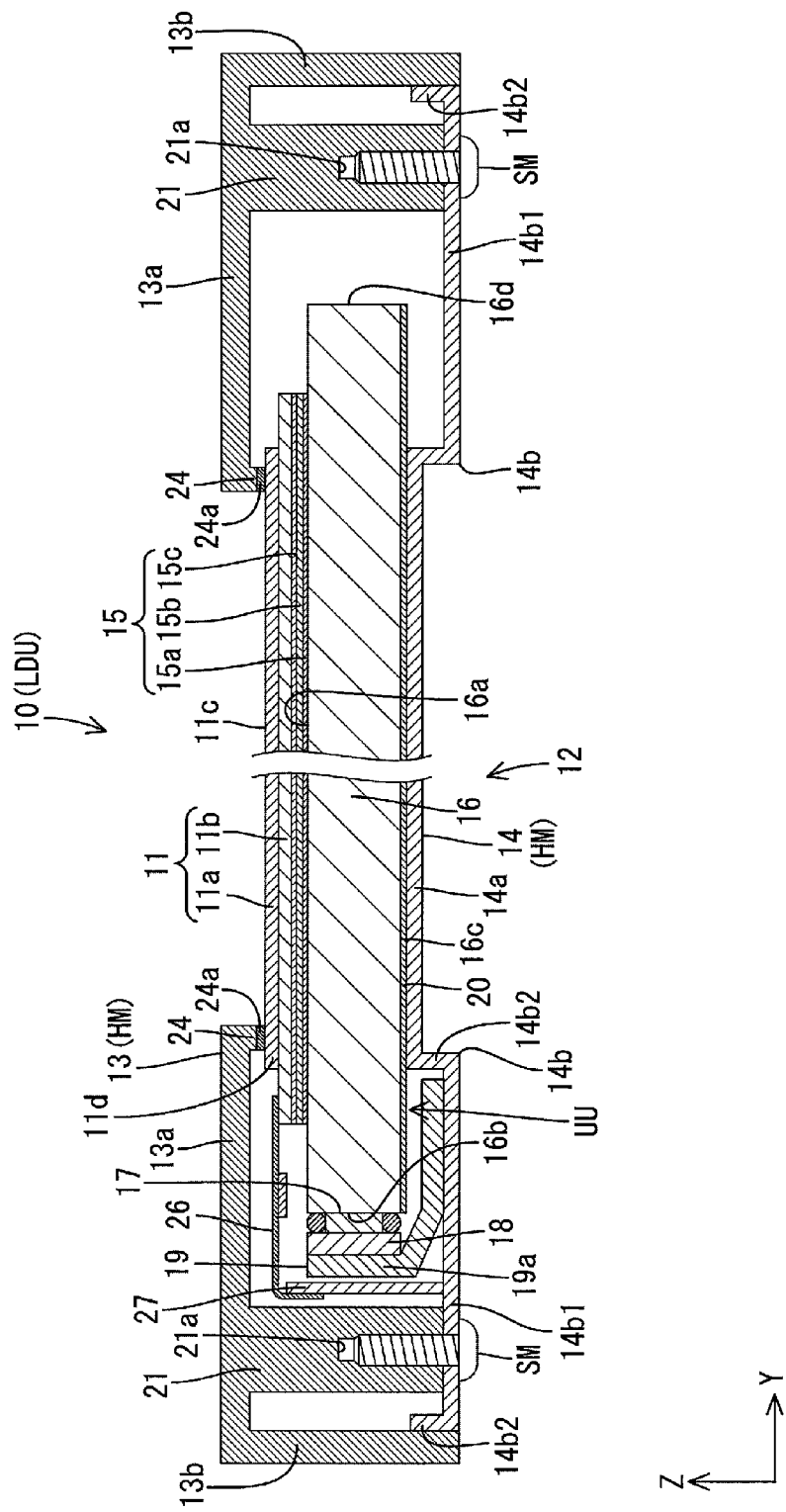
FIG. 4 is a cross-sectional view of the liquid crystal display device 10 taken along a short-side direction thereof.

As illustrated in FIGS. 4 and 5, the panel holding portion 13a integrally includes the screw attachment portions 21 that are located closer to an interior side than the sidewall 13b of the panel holding portion 13a (a position close to the light guide plate 16). Screw members SM are attached to the screw attachment portions 21. Each of the screw attachment portions 21 protrudes from an inner surface of the panel holding portion 13a toward the rear side in the Z-axis direction and has an elongated block-like shape that extends along each side of the panel holding portion 13a (in the X-axis direction or the Y-axis direction). As illustrated in FIG. 4, the screw attachment portion 21 includes a groove 21a that opens to the rear side and to which the screw member SM can be fastened. As illustrated in FIG. 4, a predetermined gap is provided between each screw attachment portion 21 on alongside and an attaching portion 19a. Further, as illustrated in FIG. 4, a space is provided between the heat dissipation member 19 and the screw attachment portion 21 to which the heat dissipation member 19 is attached. Printed circuit boards 27 are arranged in the space. Each of the printed circuit boards 27 includes the flexible boards 26 that are arranged at intervals in a long-side direction of the printed circuit board 27. The flexible boards 26 are connected to the printed circuit board 27 at the other end thereof. The printed circuit board 27 includes a connector (not illustrated) to which an end of an FPC (not illustrated) is connected. The other end of the FPC extends to the rear side of the chassis 14 through an FPC hole (not illustrated) in the chassis 14 and is connected to the control board CTB. With such a configuration, the frame 13 is apart from the heat dissipation portion 19.

As illustrated in FIGS. 4 and 5, the panel holding portion 13a integrally includes a holding protrusion 24 that protrudes from an inner edge of the panel holding portion 13a toward the rear-surface side, i.e., toward the liquid crystal panel 11. The holding protrusion 24 includes a shock absorber 24a at its protruded end. The holding protrusion 24 can press the liquid crystal panel 11 from the front side via the shock absorber 24a in between. In this configuration, a light exit surface 16a of the light guide plate 16 is pressed by the holding protrusion 24 with the optical member 15 and the liquid crystal panel 11 in between. The light guide plate 16 is supported by the holding protrusion 24 such that the light guide plate 16 can slide in a thickness direction (an arrangement direction of the light guide plate 16, the LEDs 17, and the LED board 18 or the Y-axis direction) of the LED board 18. The holding protrusion 24 and the shock absorber 24a have a frame-like shape along an entire inner edge of the panel holding portion 13a.

As illustrated in FIG. 3, the chassis 14 has a substantially longitudinal shallow tray shape as a whole and covers overall areas of the light guide plate 16 and the integral unit UU from the rear side. A rear outer surface of the chassis 14 (a surface of the chassis 14 opposite from a surface that faces the integral unit UU) is seen from the rear side and constitutes a back surface of the liquid crystal display device 10. The chassis 14 includes a first bottom-plate portion 14a (an example of a bottom plate) and a pair of second bottom-plate portions (an example of the bottom plate) 14b. The first bottom-plate portion 14a has a landscape rectangular shape similar to the light guide plate 16. Each of the second bottom-plate portions 14b protrudes from a long-side end of the first bottom-plate portion 14a toward the rear side to form a step. The heat dissipation member 19 is arranged in one of the second bottom-plate portions 14b.

As illustrated in FIGS. 3 and 4, the first bottom-plate portion 14a has a plane plate shape so as to receive a large portion of the light guide plate 16 in its middle portion with respect to the short-side direction (except the end portions with respect to the short-side direction) from the rear side. The first bottom-plate portion 14a will be referred to as alight guide plate receiving portion. As illustrated in FIG. 5, end portions of the first bottom-plate portion 14a in the long-side direction extend to the outer side with respect to the end portions of the light guide plate 16 in the long-side direction. The end portions of the first bottom-plate portion 14a in the long-side direction are screw mount portions 14a1 (refer to as FIG. 4) to which the screw members SM are attached from the outside. The screwed members SM hold the frame 13 and the chassis 14 in a fixed condition.

As illustrated in FIGS. 3 and 4, the second bottom-plate portions 14b are located so as to sandwich the first bottom-plate portion 14a from sides of the first bottom-plate portion 14a with respect to its short-side direction. Each second bottom-plate portion 14b is recessed from the first bottom-plate portion 14a toward the rear side. In one of the second bottom-plate portions 14b, the heat dissipation portion 19, which is a part of components constituting the integral unit UU, is arranged. Each second bottom-plate portion 14b includes a screw mount portion 14b1 and side plates 14b2. The screw mount portion 14b1 is parallel to the first bottom-plate portion 14a, and the screw members SM are attached to the screw mount portion 14b1 from the outside. The side plates 14b2 protrude from ends of the screw mount portion 14b1 toward the front side. One of the side plates 14b2 on the inner side continues to the first bottom-plate portion 14a. In one of the second bottom-plate portions 14b in which the heat dissipation member 19 is arranged, an inner surface of the screw mount portion 14b1 is in surface-contact with a part of a plate-like portion 19b of the heat dissipation member 19 that constitutes the heat dissipation member 19. The other one of the side plates 14b2 on an outer side included in the second bottom-plate portion 14b is fitted in a space provided between the long side screw attachment portion 21 and the sidewall portion 13b. Namely, the outer side plate 14b2 has a positioning function with which the chassis 14 is properly positioned with respect to the frame 13 in the Y-axis direction.

Next, the light guide plate 16 that constitutes apart of the integral unit UU will be described. The light guide plate 16 is made of a substantially transparent (high transmissivity) synthetic resin (e.g. acrylic resin or polycarbonate such as PMMA) which has a refractive index sufficiently higher than that of the air. As illustrated in FIG. 3, the light guide plate 16 has a landscape rectangular shape in a plan view similar to the liquid crystal panel 11 and the optical member 15. A thickness of the light guide plate 16 is larger than a thickness of the optical member 15. A long-side direction and a short-side direction of the main surface of the light guide plate 16 correspond to the X-axis direction and the Y-axis direction, respectively. A thickness direction of the light guide plate 16 that is perpendicular to the main surface corresponds to the Z-axis direction. The light guide plate 16 is arranged on the rear side of the optical member 15 and sandwiched between the optical member 15 and the chassis 14. As illustrated in FIG. 4, at least a short-side dimension of the light guide plate 16 is larger than short-side dimensions of the liquid crystal panel 11 and the optical member 15. The light guide plate 16 is arranged such that ends thereof in the short-side direction (ends along the long-side direction) are located outward (so as not to overlap each other in a plan view) with respect to the ends of the liquid crystal panel 11 and the optical member 15. Further, the light guide plate 16 is arranged such that one of the long-side side surfaces thereof (a light entrance surface 16b) faces the mount surface 18a of the LED board 18. Light emitted from the LEDs 17 enters the light guide plate 16 through the one of the long-side side surface thereof. The light guide plate 16 is configured to guide the light, which is emitted from the LEDs 17 and enters the light guide plate 16 through the ends thereof in its short-side direction, toward the optical member 15 (on the front side).

One of main surfaces of the light guide plate 16 that faces the front (a surface facing the optical member 15) is the light exit surface 16a. Light exits the light guide plate 16 through the light exit surface 16a toward the optical member 15 and the liquid crystal panel 11. Outer peripheral side surfaces of the light guide plate 16 that are adjacent to the main surface thereof include elongated long-side surfaces that extend in the X-axis direction. One of the long-side surfaces is opposite the LEDs 17 (the LED board 18) with specified distances therefrom and serves as the light entrance surface 16b through which light from LEDs 17 enters. On the other hand, the other side surface of the light guide plate 16 opposite from the light entrance surface 16b is an opposed surface 16d. On an opposed surface 16d side, the LED board 18 and the heat dissipation portion 19 are not arranged. As illustrated in FIG. 4, a reflection sheet 20 is arranged on a rear side of the light guide plate 16, that is, on an opposed surface 16c opposite from the light exit surface 16a (a surface facing the chassis 14). The reflection sheet 20 is arranged to cover an entire area of the opposed surface 16c.

Figure 7:
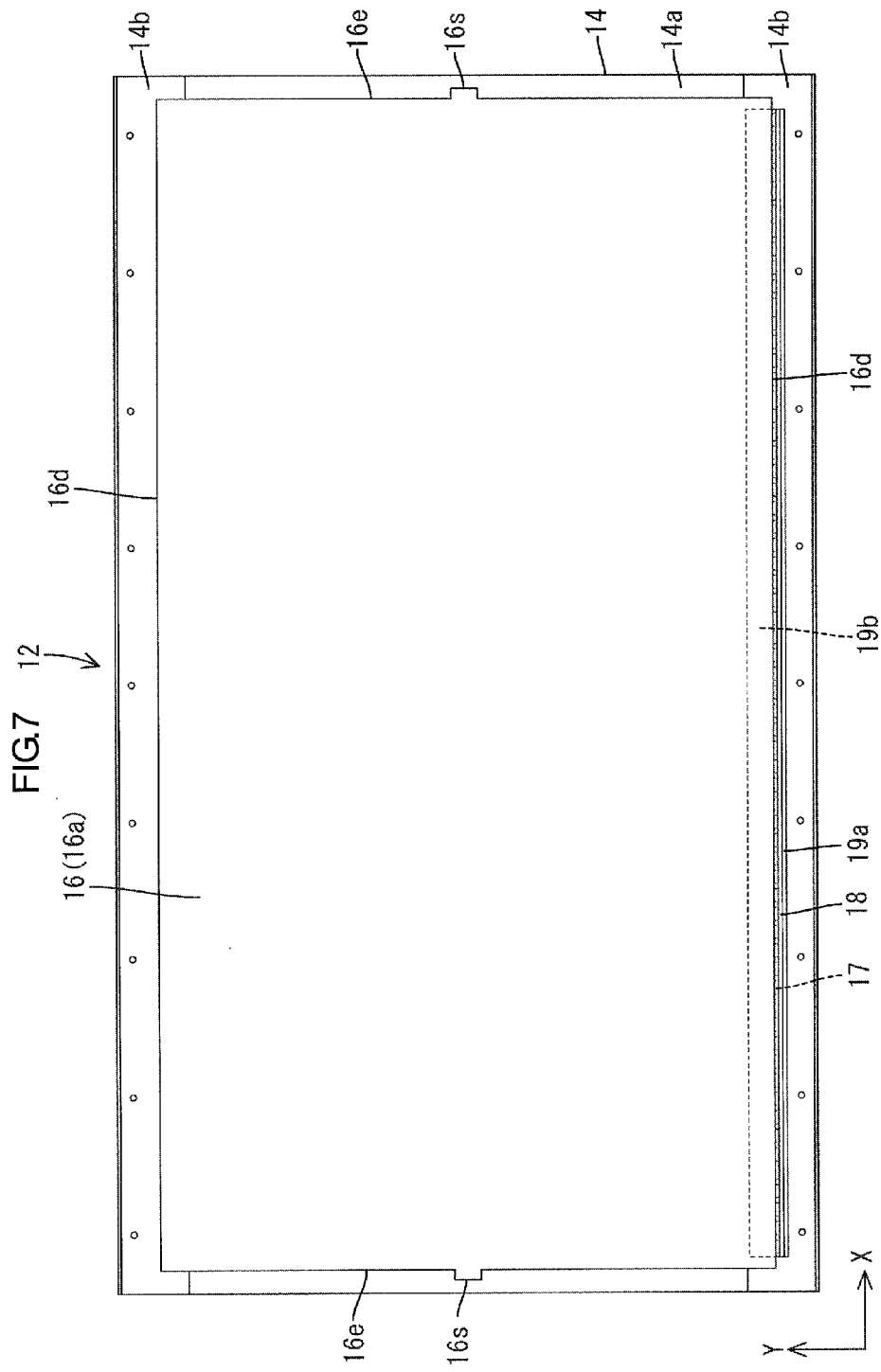
FIG. 7 is a plan view of a backlight device 12 viewed from a front side.
Figure 8:
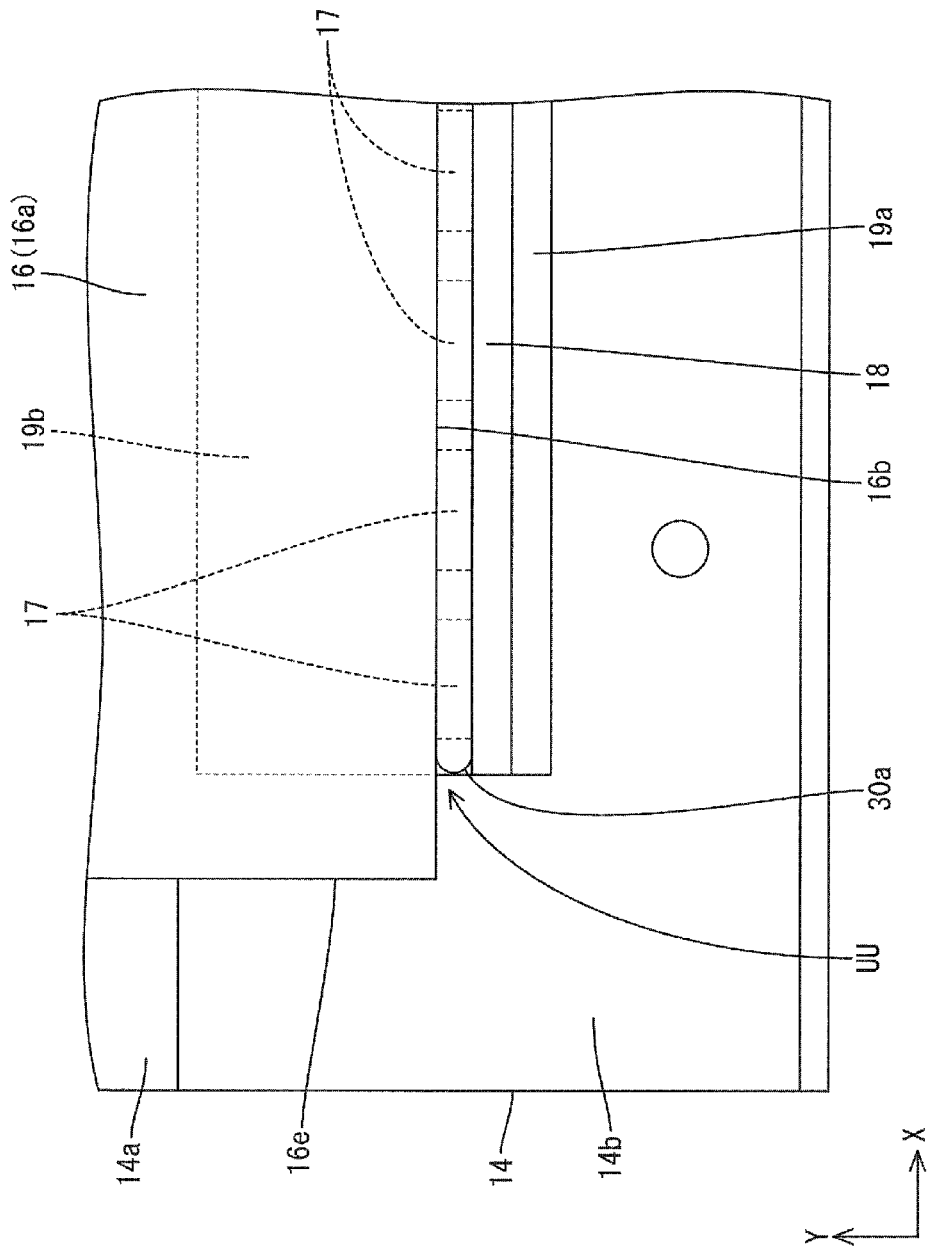
FIG. 8 is a magnified plan view of a major part in FIG. 7.

As illustrated in FIG. 7, short-side surfaces 16e and 16e of the light guide plate 16 include the positioning protrusions 16s (refers to FIG. 3). The positioning protrusion 16s is located about a middle portion of the short-side surface with respect to its short-side direction (in the Y-axis direction). The positioning protrusion 16s protrudes outward from the light guide plate 16 so as to have a block-like shape. The positioning protrusion 16s is located at a substantially middle portion of the opposed surface 16d. The positioning protrusion 16s has a rectangular shape in a plan view having a dimension such that the positioning protrusion 16s fits in the positioning recess 21t formed in the screw attachment portion 21 of the frame 13. The positioning protrusions 16s of the short-side surfaces 16e and 16e of the light guide plate 16 are in the same arrangement and the same size.

The reflection sheet 20 is arranged so as to be sandwiched between the chassis 14 and the light guide plate 16. Light that travels from the opposed surface 16c toward the rear is reflected toward the front by the light guide reflection sheet 20. The reflection sheet 20 is made of synthetic resin with a surface in white having high light reflectivity.

Next, the LEDs 17 and the LED board 18 included in the integral unit UU will be described. Each LED 17 includes an LED chip arranged on a board fixed on the LED board 18 and sealed with resin. The LED chip mounted on the board has one main light emission wavelength. Specifically, the LED chip that emits light in a single color of blue is used. On the other hand, the resin that seals the LED chip contains phosphors dispersed therein. The phosphors emit light in a predetermined color when excited by blue light emitted from the LED chip. Overall color of light emitted from the LED 17 is white. The phosphors may be selected, as appropriate, from yellow phosphors that emit yellow light, green phosphors that emit green light, and red phosphors that emit red light. The phosphors may be used in combination of the above phosphors. The LED 17 includes a main light-emitting-surface that is opposite to a surface on which the LED board 18 is mounted (a surface opposite the light entrance surfaces 16b of the light guide plate 16). Namely, the LED 17 is a top-surface-emitting type LED. The LED 17 includes a side surface 17a that is a front side of the LED 17. The side surface 17a is in the same level with the light exit surface 16a of the light guide plate 16 in the Z-axis direction.

As illustrated in FIGS. 3 and 7, the LED board 18 included in the integral unit UU has an elongated plate-like shape and extends in the long-side direction of the light guide plate 16 (in the X-axis direction). The LED board 18 is arranged in the frame 13 and the chassis 14 such that a main board surface of the LED board 18 is parallel to the X-Z plane, that is, parallel to the light entrance surface 16b of the light guide plate 16. The main board surface of the LED board 18 facing an inner side, that is, a surface of the LED board 18 facing the light guide plate 16 (the surface opposite the light guide plate 16, referred to as the mount surface 18a (refer to FIG. 6)) includes the LEDs 17 having the above-described configuration thereon. The LEDs 17 are arranged in line at intervals on the mount surface 18a of the LED board 18 along the long-side direction of the LED board 18 (the X-axis direction). An axis of light emitting from each LED 17 is substantially aligned with the Y-axis direction. The substrate of the LED board 18 is made of metal, for instance, aluminum. Wiring patterns (not illustrated) are formed on the mount surface 18a of the LED board 18 via an insulating layer. A material used for LED board 18 may be an insulating material including ceramic.

Next, the heat dissipation member 19 and photo curable resin members 30a and 30b that are main components of this embodiment and constitute a part of the integral unit UU will be described. As illustrated in FIGS. 3 and 4, the heat dissipation member 19 is made of metal having high thermal conductivity, such as aluminum. The heat dissipation member 19 includes the board attachment portion (an example of an attachment portion) 19a and a plate-like portion 19b. The LED board 18 is attached on the board attachment portion 19a. The plate-like portion 19b having a plate-like shape is partially in contact with the second bottom-portion 14b of the chassis 14. The heat dissipation member 19 has a long-side dimension substantially equal to the long-side dimension of the LED board 18. The board attachment portion 19a of the heat dissipation member 19 has a plate-like shape parallel to the plate surface of the LED board 18 and the light entrance surface 16b of the light guide plate 16. A long-side direction, a short-side direction, and a thickness direction of the board attachment portion 19a are aligned with the X-axis direction, the Z-axis direction, and the Y-axis direction, respectively. The LED board 18 is mounted on an inner surface of the board attachment portion 19a, that is, a plate surface that faces the light guide plate 16 via the photo curable resins 30a and 30b, which will be described later. While the board attachment portion 19a has a long-side dimension that is substantially equal to the long-side dimension of the LED board 18, a short-side dimension of the board attachment portion 19a is slightly larger than a short-side dimension of the LED board 18. Therefore, a rear end portion (a chassis 14 side) of the board attachment portion 19a in the short-side direction protrudes outward with respect to a rear end portion of the LED board 18 in the Z-axis direction. An outer plate surface of the board attachment portion 19a is opposite the screw attachment portion 21 included in the frame 13. The board attachment portion 19a is located between the screw attachment portion 21 of the frame 13 and the light guide plate 16. The board attachment portion 19a extends from an inner end of the plate-like portion 19b, which will be describes later, toward the frame 13 side along the Z-axis direction (a direction in which the liquid crystal panel 11 and the light guide plate 16 overlap each other). In other words, the board attachment portion 19a extends from an end of the plate-like portion 19b closer to the LEDs 17 (the light guide plate 16) toward the front side.

The plate-like portion 19b of the heat dissipation member 19 extends from the board attachment portion 19a toward the light guide plate 16. The plate-like portion 19b includes two portions. One of the two portions extends at an angle from a chassis 14-side end of the board attachment portion 19a toward the second bottom-plate portion 14b until the portion comes in contact with the second bottom-plate portion 14b. The other one of the two portions extends parallel to a plate surface of the second bottom-plate portion 14b while being in contact with the second bottom-plate portion 14b. The portion extending from the end of the board attachment portion 19a has a planar shape that is tilted against the plate surface of the board attachment portion 19a and the plate surface of the second bottom-plate portion 14b. A long-side direction of the portion extending from the end of the board attachment portion 19a corresponds to the X-axis direction. The portion extending parallel to the plate surface of the second bottom-plate portion 14b further extends from a contact portion thereof that is in contact with the second bottom-plate portion 14b toward a middle portion of the light guide plate 14 along the plate surface of the second bottom-plate portion 14b. The portion of the plate-like portion 19b that extends at an angle toward the second bottom-plate portion 14b is subject to spring processing and is a flat spring. The portion of the plate-like portion 19b that is parallel to the second bottom-plate portion 14b is in contact with (in elastically contact with) the plate surface of the second bottom-plate portion 14b while applying an elastic force with the flat spring to the plate surface of the second bottom-plate portion 14b. In this configuration, a part of the plate-like portion 19b is in contact with the second bottom-plate portion 14b but not fixed thereto. Therefore, the heat dissipation member 19 can slide on the plate surface of the second bottom-plate portion 14b in the thickness direction of the LED board 18 (a direction in which the light guide plate 16, the LED 17, and the LED board 18 are arranged or the Y-axis direction). The heat dissipation member 19 slides with a contact surface of the plate-like portion 19b being in contact with the second bottom-plate portion 14b. Silicone grease 32 as a lubricant is provided on the contact portion 19b1 of the plate-like portion 19b that is in contact with the second bottom-plate portion 14b. Therefore, the plate-like portion 19b is more likely to slide on the second bottom-plate portion 14b in a plate surface direction of the light guide plate 16 (in an X-Y plane direction).

The photo curable resin members 30a and 30b are arranged between the mount surface 18a of the LED board 18 and the light entrance surface 16b of the light guide plate 16. The photo curable resin members 30a and 30b are made of resin that is cured with ultraviolet light. With the photo curable resins 30a and 30b, the mount surface 18a of the LED board 18 is fixed to the light entrance surface 16b of the light guide plate 16. As illustrated in FIG. 9, the photo curable resins 30a and 30b are arranged on the mount surface 18a of the LED board 18 on an upper side and a lower side with respect to the LEDs 17. The photo curable resins 30a and 30b are arranged over the long-side direction (the X-axis direction) of the LED board 18. A thickness of each of the photo curable resins 30a and 30b is substantially the same as a thickness of each LED 17 arranged on the mount surface 18a of the LED board 18. Therefore, the LED board 18 is fixed to the light guide plate 16 while a light-emitting surface of each LED 17 on the mount surface 18a is in contact with the light entrance surface 16b of the light guide plate 16.

As described above, the light guide plate 16, the LEDs 17, the LED board 18, the heat dissipation member 19, and the photo curable resins 30a and 30b are connected to one another as an unit within the frame 13 and the chassis 14. The unit is sandwiched between the chassis 14 and the frame 13 as the integral unit UU. As described earlier, the light guide plate 16 is pressed by the holding protrusion 24 from a light exit surface 16b side. Further, the plate-like portion 19b of the heat dissipation member 19 is elastically in contact with the plate surface of the second bottom-plate portion 14b and supported by the second bottom-plate portion 14b while receiving a reaction force from the second bottom-plate portion 14b. Therefore, the integral unit UU is held in an upper-lower direction (a thickness direction of the light guide plate 16 or the Z-axis direction) thereof. In this configuration, even if the liquid crystal display device 10 is arranged in a vertical position, the integral unit UU does not fall downward in the vertical direction by its weight. The integral unit UU is held in a predetermined position in the plate surface direction (the X-Y plane direction) of the light guide plate 16 between the frame 13 and the chassis 14. Moreover, as described earlier, the light guide plate 16 is supported by the holding protrusion 24 from the light exit surface 16b side such that the light guide plate 16 can slide in the thickness direction of the LED board 18 (the arrangement direction in which the light guide plate 16, the LEDs 17, and the LED board 18 are arranged or the Y-axis direction). The plate-like portion 19b of the heat dissipation member 19 can slide on the plate surface of the second bottom-plate portion 14b in the thickness direction of the LED board 18 (the arrangement direction in which the light guide plate 16, the LEDs 17, and the LED board 18 are arranged or the Y-axis direction). Therefore, the integral unit UU can slide on the frame 13 and the chassis 14 with an upper side and a lower side of the unit UU. In this configuration, if the light guide plate 16 moves in the Y-axis direction by vibrations, whole of the integral unit UU moves in the Y-axis direction and thus the movement is canceled out.

Next, arrangement of the integral unit UU during production processes of the liquid crystal display device 10 will be described. During production of the liquid crystal display device 10, components are assembled in sequence from the front surface side (an upper side in FIG. 4) of the liquid crystal display device 10. Specifically, the integral unit UU is prepared in advance, and the positioning protrusions 16s of the light guide plate 16 included in the integral unit UU is fitted in the respective positioning recesses 21t of the frame 13 for positioning the light guide plate 16 in the frame 13. With the positioning protrusions 16s being fitted in the respective positioning recesses 21t, the light guide plate 16 is attached in the frame 13 and then, the chassis 14 is attached thereto. More specifically, first, the LED board 18 is fixed to the heat dissipation member 19 with a screw. Then, the light guide plate 16 including the positioning protrusions 16s is prepared. The LED board 18 is arranged such that the mount surface 18a thereof faces the light entrance surface of the light guide plate 16 and attached to the light guide plate 16 with the photo curable resins 30a and 30b therebetween. The light guide plate 16 and the LED board 18 are attached with the light-emitting surfaces of the LEDs 17 being in contact with the light entrance surface of the light guide plate 16. Ultraviolet light is applied to the photo curable resins 30a and 30b to cure. Consequently, the LED board 18 attached on the heat dissipation member 19 is fixed to the light guide plate 16. As a result, the integral unit UU in which the light guide plate 16, the LEDs 17, the LED board 18, and the heat dissipation member 19 are attached to one another is prepared. The light guide plate 16 is then attached to the frame 13 and thus the integral unit UU including the light guide plate 16 is set in the frame 13.

In the integral unit UU that is held between the frame 13 and the chassis 14, the LED board 18 and the light guide plate 16 are fixed with the photo curable resins 30a and 30b. Therefore, even if the light guide plate 16 moves in the thickness direction of the LED board 18 (the arrangement direction in which the light guide plate 16, the LEDs 17, and the LED board 18 are arranged or the Y-axis direction) by vibrations, a distance between the LED board 18 and the light guide plate 16 does not change. Namely, the light-emitting surfaces of the LEDs 17 remain in contact with the light entrance surface 16b of the light guide plate 16. Further, the heat dissipation member 19 included in the integral unit UU is apart from the frame 13, and only a part of the plate-like portion 19b is in contact with the second bottom-plate portion 14b of the chassis 14. Therefore, most of the heat generated near the LEDs 17 is transferred to the chassis 14 side via the heat dissipation member 19 and effectively released to the outside of the liquid crystal display device 10. With this configuration, the heat generated near the LEDs 17 is less likely to be transferred to the frame 13 side and thus a temperature of the hands-on frame 13 is less likely to excessively increase.

As described above, in the liquid crystal display device 10 according to this embodiment, the LED board 18 and the light guide plate 16 are fixed to each other with the photo curable resins 30a and 30b. Therefore, the distance between the LEDs 17 and the light guide plate 16 remains constant. Further, the light guide plate 16, the LEDs 17, the LED board 18, and the heat dissipation member 19 are connected to one another as the integral unit UU. The light guide plate 16 is supported by the panel holding portion 13a of the frame 13 from the light exit surface 16a side such that the light guide plate 16 can slide. On the other hand, the plate-like portion 19b of the heat dissipation member 19 is elastically in contact with the second bottom-plate portion 14b and supported by the second bottom-plate portion 14b while receiving a reaction force from the second bottom-plate portion 14b. The unit of the light guide plate 16, the LEDs 17, the LED board 18, and the heat dissipation member 19 is supported by the frame 13 and the chassis 14 from two sides of the light guide plate 16 with respect to its thickness direction (the Z-axis direction). The unit is held so as to slide (the plate-like portion 19b is just in contact with the second bottom-plate portion 14b on a chassis 14 side) in the thickness direction of the LED board 18 (the Y-axis direction or the arrangement direction in which the light guide plate 16, the LEDs 17, and the LED board 18 are arranged). In this configuration, if the light guide plate 16 vibrates, the unit including the heat dissipation member 19 and the light guide plate 16 slides in the thickness direction of the LED board 18 (the Y-axis direction) while the distance between the LEDs 17 and the light entrance surface 16b of the light guide plate 16 remains constant. Specifically, the unit slides on the heat dissipation member 19 at the contact surface that is in contact with the second bottom-plate portion 14b and on the light guide plate 16 at a portion of the light entrance surface 16a supported by the panel holding portion 13a of the frame 13. Accordingly, the vibration of the light guide plate 16 is absorbed. Further, the heat dissipation member 19 is apart from the frame 13 while being in contact with the second bottom-plate portion 14b of the chassis 14. Therefore, most of the heat transferred from the LEDs 17 to the heat dissipation member 19 is transferred to the second bottom-plate portion 14b of the chassis 14, and effectively released to the outside of the liquid crystal display device 10. As described above, in the liquid crystal display device without a cabinet, the distance between the light guide plate 16 and the LEDs 17 is less likely to change even if the light guide plate 16 vibrates. Further, an excessive temperature increase of the hands-on frame 13 can be suppressed.

In the liquid crystal display device 10 according to this embodiment, the photo curable resins 30a and 30b are provided as the fixing member to fix the light guide plate 16 and the LED board. In a manufacturing process of the liquid crystal display device 10, the photo curable resins 30a and 30b, which are the fixing members, are arranged on the mount surface 18a of the LED board 18. The LED board 18 is attached to the light entrance surface 16b of the light guide plate 16 via the photo curable resins 30a and 30b, and the photo curable resins 30a and 30b are cured with light. With this configuration, the LED board 18 is easily fixed to the light guide plate 16.

In the liquid crystal display device 10 according to this embodiment, the silicone grease 32 as a lubricant is applied to the contact portion between the plate-like portion 19b and the second bottom-plate portion 14b. With the silicone grease 32, a friction coefficient in the contact portion between the plate-like portion 19b and the second bottom-plate portion 14b decreases. Therefore, the plate-like portion 19b is more likely to slide on the second bottom plate portion 14b if vibrations occur in the light guide plate 16. Thus, the vibrations of the light guide plate 16 are effectively absorbed.

In the liquid crystal display device 10 according to this embodiment, the LED board 18 has a rectangular shape. The photo curable resins 30a and 30b are provided to end portions of the mount surface 18a of the LED board 18 and the light entrance surface 16b of the light guide plate 16 with respect to the respective short-side directions. Further, the photo curable resins 30a and 30b are provided substantially over the long-side direction (the X-axis direction) of each of the mount surface 18a of the LED board 18 and the light entrance surface 16b of the light guide plate 16. In this configuration, the photo curable resins 30a and 30b do not block light emitted from the LEDs 17 and traveling toward the light entrance surface 16b of the light guide plate 16. Further, the photo curable resins 30a and 30b are arranged apart from each other. Therefore, the LED board 18 and the light guide plate 16 are securely fixed to each other by the photo curable resins 30a and 30b. Furthermore, as areas of the LED board 18 and the light guide plate 16 that are fixed by the photo curable resins 30a and 30b increase, the LED board 18 and the light guide plate 16 are further securely fixed to each other.

In the liquid crystal display device 10 according to this embodiment, the light guide plate 16 includes the positioning protrusions 16s that protrude toward the frame 13. The frame 13 includes the positioning recesses each facing the positioning protrusion 16s, and each of the positioning recesses opens to the positioning protrusion 16s. The positioning recess fits the positioning protrusion 16s. In this configuration, since the positioning protrusions 16t are fitted to the positioning recesses, the light guide plate 16 can be positioned between the frame 13 and the chassis 14 in the plate surface direction (the X-Y plane direction) of the light guide plate 16. Therefore, while a configuration in which the light guide plate 16 is positioned between the frame 13 and the chassis 14 is achieved, the distance between the light guide plate 16 and the LEDs 17 does not change even if the light guide plate 16 vibrates.

Figure 10:
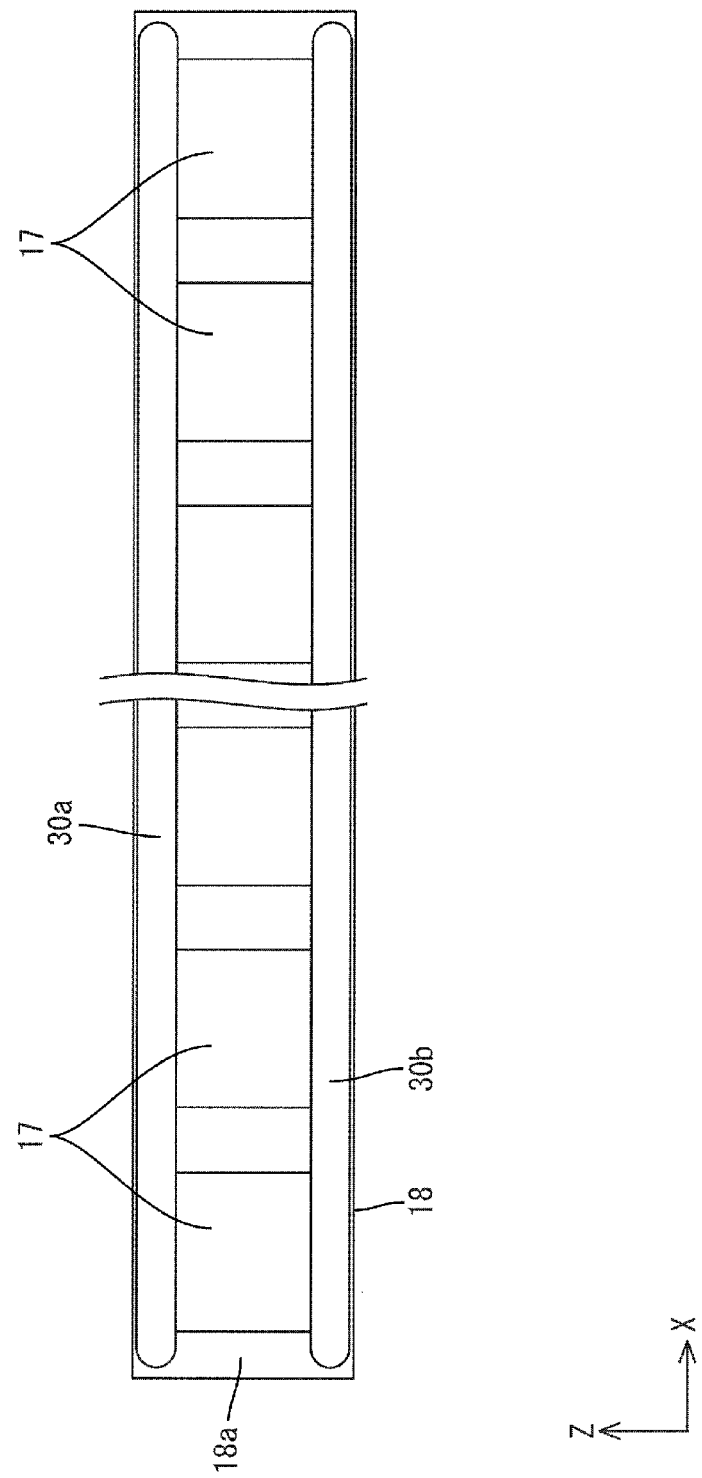
FIG. 10 is a plan view of LEDs 17, an LED board 18, and a photo curable resin 30 seen from a front side.
Figure 11:
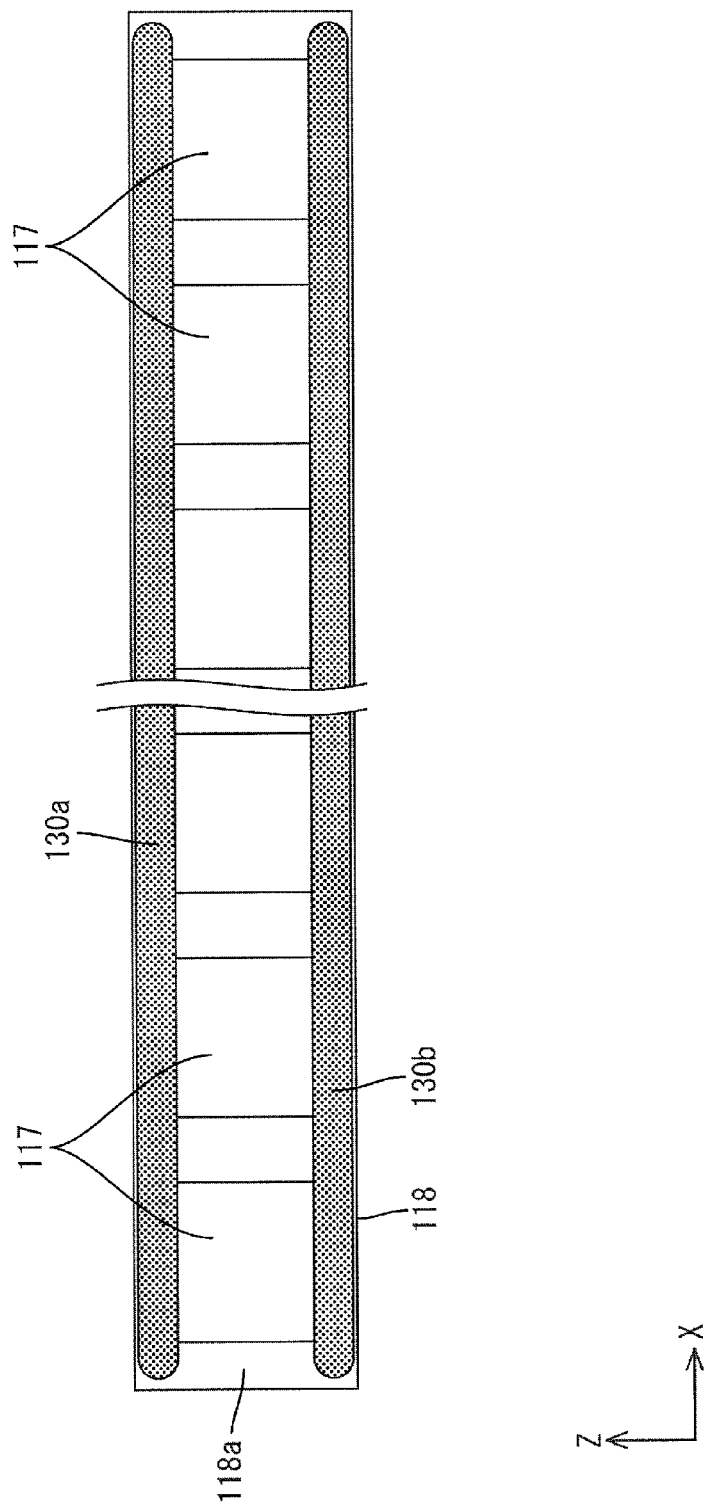
FIG. 11 is a plan view of LEDs 117, an LED board 118, and a photo curable resin 130 according to a modification seen from a front side.

Modification of this embodiment will be described. In a liquid crystal display device according to this modification, material of a fixing member 130 to fix a light guide plate and an LED board 118 is different from that in the first embodiment. The other constructions, functions, and effects similar to the first embodiment will not be described. In FIG. 11, portions indicated by numerals including the reference numerals in FIG. 10 with 100 added thereto have the same configurations as in the first embodiment. As illustrated in FIG. 11, the fixing member 130 of this modification is made of a black material having a light blocking property. The fixing member 130 made of such a material can block a part of rays of light exiting LEDs 117 and directly traveling toward a liquid crystal display panel. Therefore, the rays of light emitted from the LEDs 117 are less likely to directly enter an end surface of the liquid crystal panel, and uneven brightness on the display surface that may be caused thereby can be reduced.

<Second Embodiment>

Figure 12:
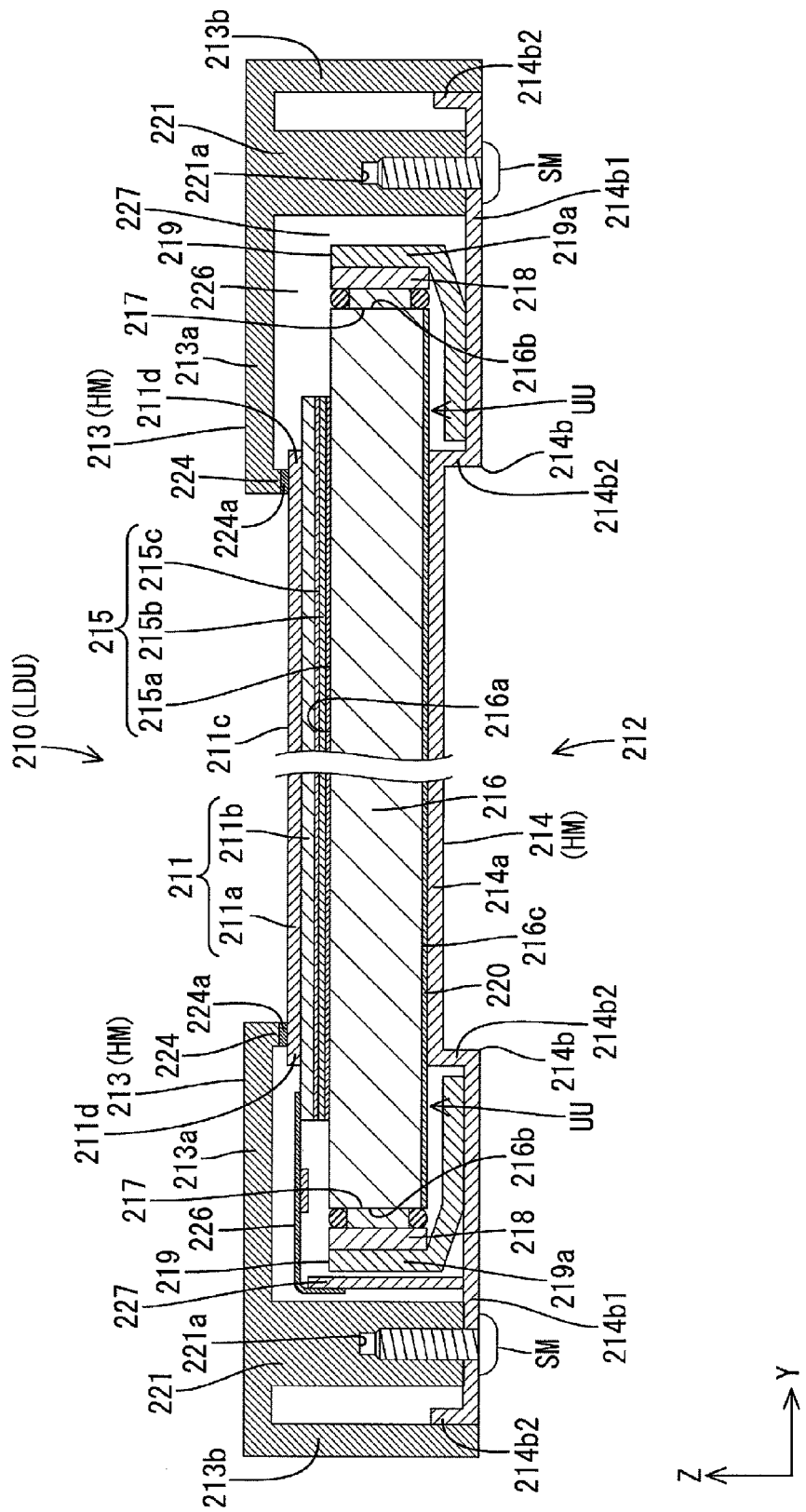
FIG. 12 is a cross-sectional view of a liquid crystal display device 210 according to a second embodiment taken along a short-side direction thereof.

The second embodiment will be described with reference to the drawings. In the second embodiment, the number of light entrance surfaces of a light guide plate is different from that in the first embodiment. The other constructions, functions, and effects similar to the first embodiment will not be described. In FIG. 12, portions indicated by numerals including the reference numerals in FIG. 4 with 200 added thereto have the same configurations as in the first embodiment.

As illustrated in FIG. 12, in a liquid crystal display device 210 according to the second embodiment, a light guide plate 216 includes a pair of opposite side-surfaces on long sides thereof. The opposite side-surfaces are light entrance surfaces 216b. An LED board 218 and a heat dissipation member 219 are arranged so as to face each of the light entrance surfaces 216b and fixed thereto with fixing members 230a and 230b in between. In this configuration, the LED boards 218 are fixed on the respective side-surfaces of the light guide plate 216. Therefore, the integral unit UU including the light guide plate 216, the LED boards 218, and the heat dissipation members 219 connected to one another can slide while the light guide plate 216 is sandwiched between the LED boards 218. In the configuration that the LEDs 217 are arranged on the opposite side-surfaces of the light guide plate 216, the distance between the light guide plate 216 and the LEDs 217 is less likely to change even if vibrations occur in the light guide plate 216. Further, an excessive temperature increase of a frame 213 as a hands-on portion can be suppressed.

<Third Embodiment>

Figure 13:
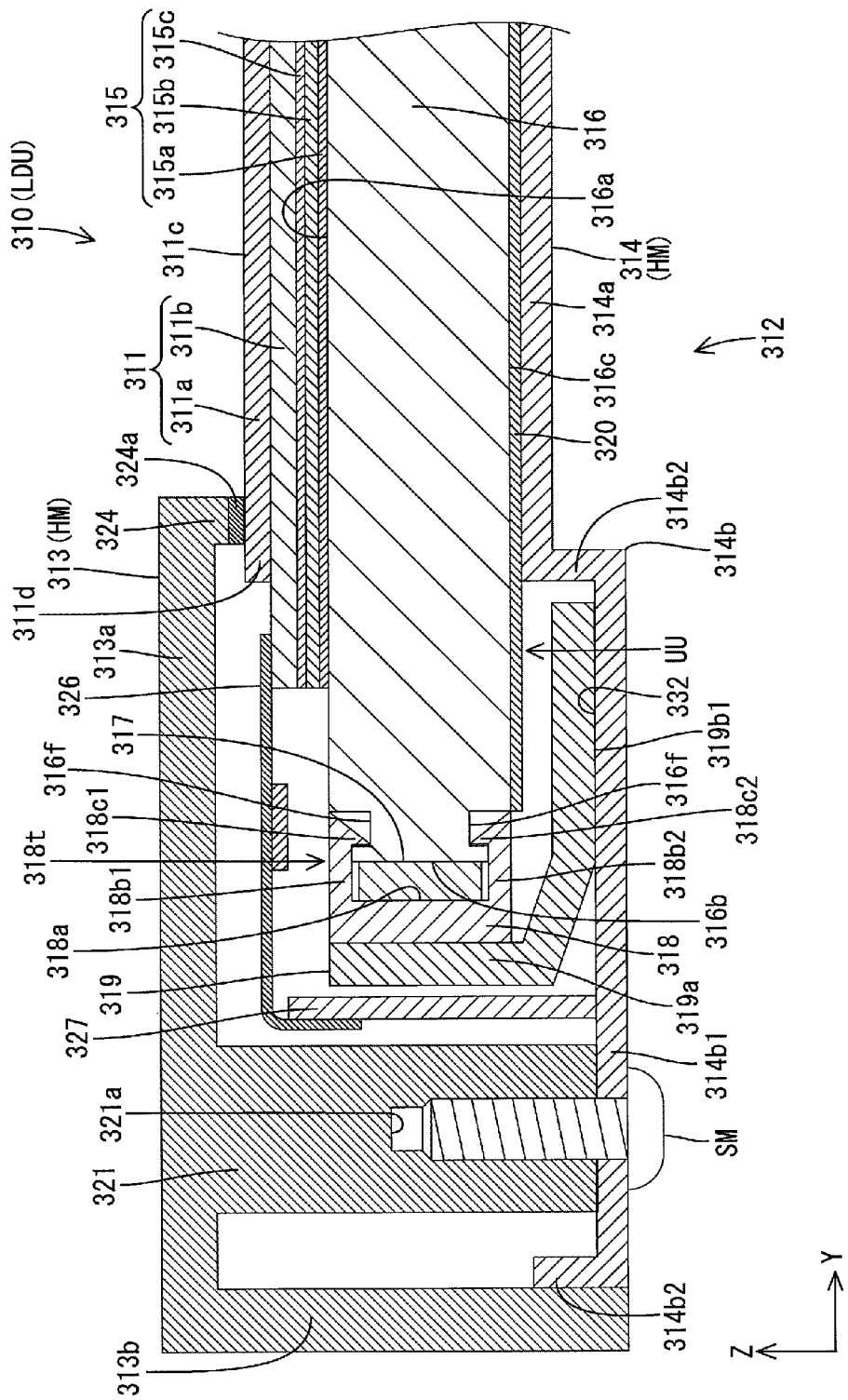
FIG. 13 is a cross-sectional view of a major part of a liquid crystal display device 310, illustrating a magnified view of a heat dissipation member 319 and its vicinity.

The third embodiment will be described with reference to the drawings. In the third embodiment, a configuration of the fixing member is different from that in the first embodiment. The other constructions, functions, and effects similar to the first embodiment will not be described. In FIG. 13, portions indicated by numerals including the reference numerals in FIG. 6 with 300 added thereto have the same configurations as in the first embodiment.

As illustrated in FIG. 13, in a liquid crystal display device 310 according to the third embodiment, a fixing member to fix a light guide plate 316 and an LED board 318 has a hook-like shape and extends toward the light guide plate 316. The fixing member is referred to as a fitting portion 318t that is to be fitted in a portion of the light guide plate 316. More specifically, the fitting portion 318t is arranged over a long-side direction (the X-axis direction) of the LED board 318. The fitting portion 318t includes extension portions 318b1 and 318b2 and hook portions 318c1 and 318c2. Each of the extension portions 318b1 and 318b2 having a plate-like shape extends toward the light guide plate 316. Each of the hook portions 318c1 and 318c2 extends at an angle from an end of the corresponding extension portion 318b1 and 318b2 toward an inner side (an intermediate side with respect to a thickness direction of the light guide plate 316) so as to form a hook-like shape. A front surface (a surface facing the intermediate side of the light guide plate 316) of each of the hook portions 318c1 and 318c2 is an inclined surface that is inclined against a light entrance surface 316b from an outer side toward an inner side. On the other hand, in an end portion of the light guide plate 316 on a light entrance surface 316b side, engaging recesses 316f are formed so as to correspond to the hook portions 318c1 and 318c2 of the fitting portion 318t. Each of the engaging recesses 316f is recessed having a dimension and a size such that the hook portion 318c1, 318c2 can be fitted in the corresponding engaging recess 316f. When the fitting portion 318t is fitted in the engaging recess 316f, the fitting portion 318t is put in a position such that the fitting portion 318t faces the light entrance surface 316b of the light guide plate 316 and moved to be closer to the engaging recess 316f and thereby, the inclined surfaces of the hook portions come in contact with upper and lower edges of the light entrance surfaces 316b. Then, the fitting portion 318t is pressed toward a middle portion side of the light guide plate 316 and thereby, the fitting portion 318t further moves toward the middle portion of the light guide plate 316 while the inclined surfaces of the hook portions keep in contact with the upper and lower edges of the light entrance surface 316b. As a result, the hook portions are fitted in the engaging recesses 316f. In a manufacturing process of the liquid crystal display device 310, the fitting portion 318t of the LED board 318 is engaged with the engaging recesses 316f and accordingly, the LED board 318 is easily fixed to the light guide plate 316.

<Fourth Embodiment>

A fourth embodiment will be described with reference to the drawings. In the fourth embodiment, a plate-like portion 419b of a heat dissipation member 419 differs from that in the first embodiment. The other structures are the same as the first embodiment. Thus, configurations, functions, and effects similar to the first embodiment will not be described. In FIG.

Figure 6:
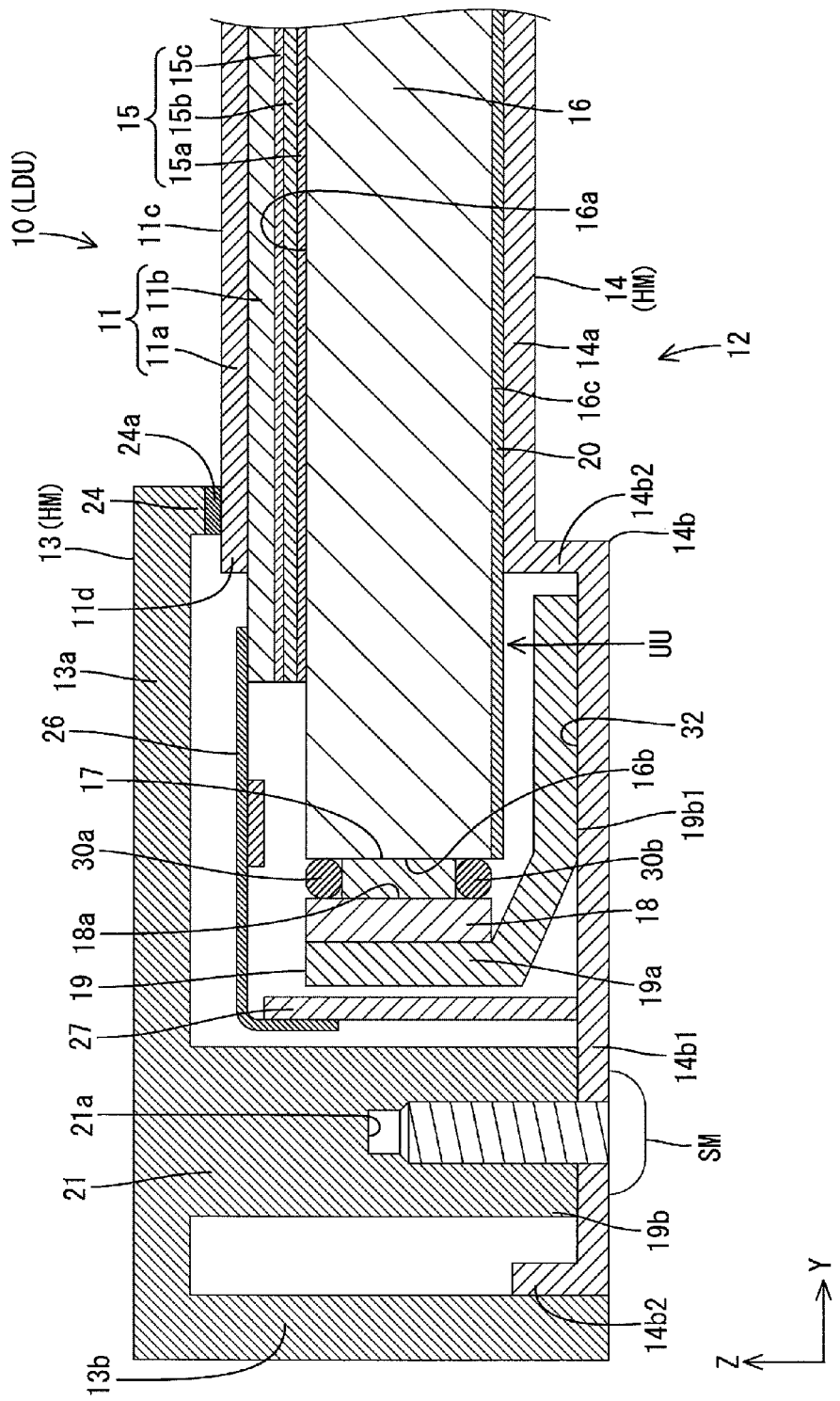
FIG. 6 is a cross-sectional view of a major part of the light crystal display device 10, illustrating a magnified view of a heat dissipation member 19 and its vicinity in FIG. 4.

14, portions indicated by numerals including the reference numerals in FIG. 6 with 400 added thereto have the same configurations as in the first embodiment.

Figure 14:
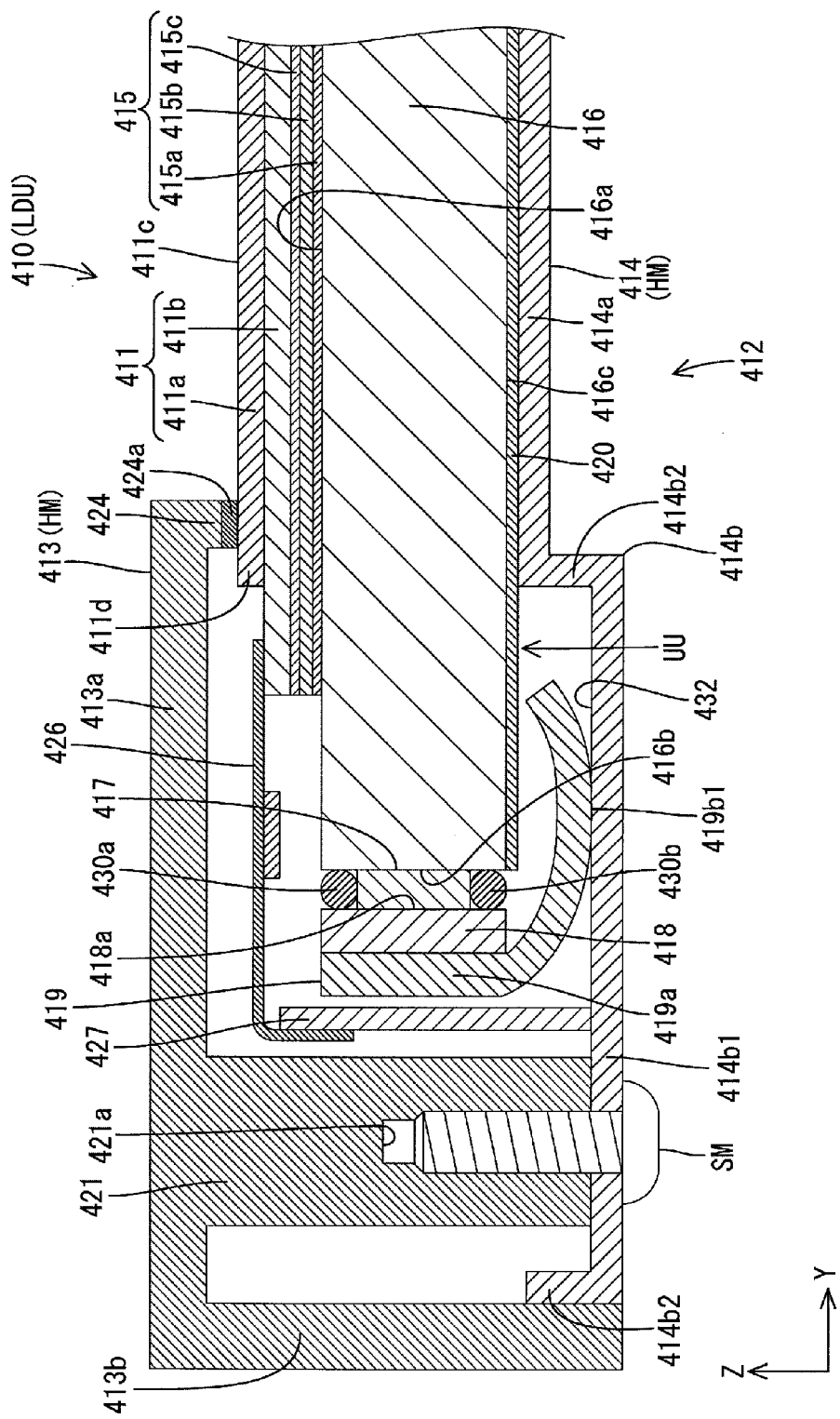
FIG. 14 is a cross-sectional view of a major part of a liquid crystal display device 410, illustrating a magnified view of a heat dissipation member 419 and its vicinity.

As illustrated in FIG. 14, in a liquid crystal display device according to the fourth embodiment, the plate-like portion 419b of the heat dissipation member 419 is a plate spring having a curved surface. The plate-like portion 419b is curved so as to be convex on a second bottom-plate portion 414b side. The plate-like portion 419b is supported by the second bottom-plate portion 414b such that a part of the curved surface of the plate-like portion 419b is in contact with the second bottom-plate portion 414b. In this configuration, the curved surface of the plate-like portion 419b is in contact with the second bottom-plate portion 414b. If this configuration is compared with a case in which the plate-like portion 419b has a flat surface and is in contact with the second bottom-plate portion 414b with the flat surface, a friction coefficient between the plate-like portion 419b and the second bottom-plate portion 414b is smaller in this configuration. Therefore, the plate-like portion 419b is more likely to slide if vibrations occur in the light guide plate 416. With this configuration, the vibrations of the light guide plate 416 can be effectively absorbed.

<Fifth Embodiment>

Figure 15:
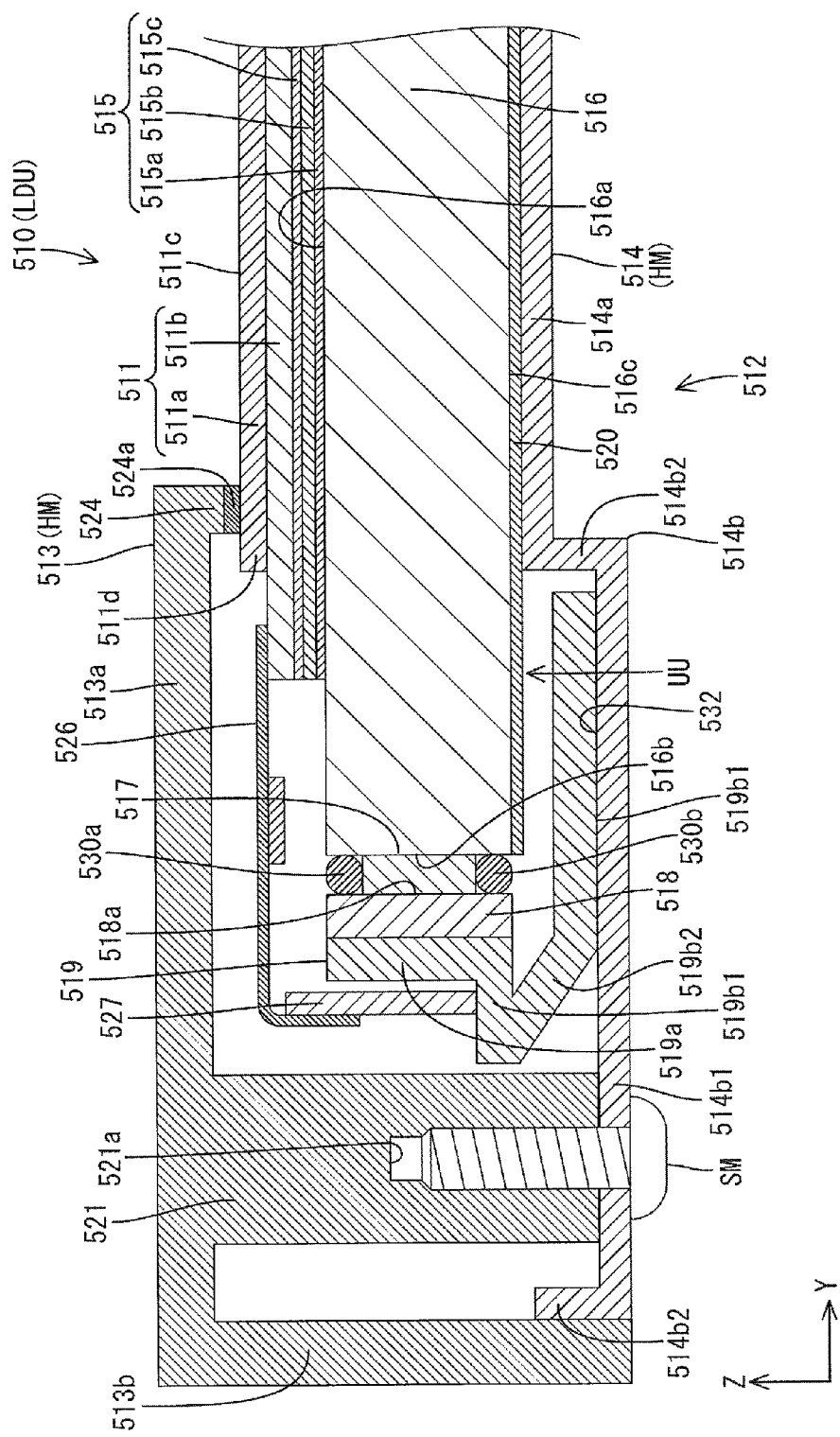
FIG. 15 is a cross-sectional view of a major part of a liquid crystal display device 510, illustrating a magnified view of a heat dissipation member 519 and its vicinity.

A fifth embodiment will be described with reference to the drawings. In the fifth embodiment, the shape of a plate-like portion 519b of a heat dissipation member 519 differs from that in the first embodiment. The other structures are the same as the first embodiment. Thus, configurations, functions, and effects similar to the first embodiment will not be described. In FIG. 15, portions indicated by numerals including the reference numerals in FIG. 6 with 500 added thereto have the same configurations as in the first embodiment.

As illustrated in FIG. 15, a liquid crystal display device according to the fifth embodiment includes the heat dissipation member 519 having a plate-like portion and a board attachment portion 519a. The plate-like portion is angled at a connection portion of the board attachment portion 519a toward a side away from a light guide plate 516. The plate-like portion is further angled toward the light guide plate 516. Specifically, the plate-like portion includes a first plate-like portion 519b1 and a second plate-like portion 519b2. The first plate-like portion 519b1 extends from an end of the attachment portion 519a on a chassis 514 side toward a side away from the light guide plate 516 so as to be parallel to a plate surface of the chassis 514. The second plate-like portion 519b2 having a plate-like shape, similar to the plate-like portion 19b of the first embodiment, extends to the second bottom-plate portion 514b and further extends from a portion that is in contact with the second bottom-plate portion 514b toward a middle portion of the light guide plate 516 parallel to and along the second bottom-plate portion 514b. In this configuration, the first plate-like portion 519b of the heat dissipation member 519 is angled toward the side away from the light guide plate 516. If the above configuration is compared with a configuration in which the plate-like portion directly extends from the connection portion of the board attachment portion 519a toward the light guide plate 516, the second plate-like portion 519b and the second bottom-plate portion 514b are in contact with each other further away from the light guide plate 516. With this configuration, a contact area between the second plate-like portion 519b and the second bottom-plate portion 514b increases. Therefore, heat dissipation effect of the heat dissipation member 519 can be enhanced.

Modifications of the above embodiments will be described below.

(1) In the above embodiments, the fixing member that fixes the LED board and the light guide plate is the photo curable resin or the fitting portion of the LED board. However, the configurations and the materials of the fixing member are not limited to those in the above embodiments.

(2) In the above embodiments, the LED board and the light guide plate are fixed such that the light-emitting surfaces of the LEDs are in contact with the light entrance surface of the light guide plate. However, the LED board and the light guide plate may be fixed such that the light-emitting surfaces of the LEDs are apart from the light entrance surface of the light guide plate.

(3) In the above embodiments, the light guide plate includes the positioning recesses on the short-side surfaces thereof. The frame includes the positioning recesses that are located corresponding to the positioning protrusions. However, the configuration for positioning the light guide plate in the frame is not limited to the above configuration. The light guide plate may not include the positioning portions. Even in such a configuration, since the unit is supported between the frame and the chassis from its upper and lower sides, the light guide plate can be positioned in the frame.

(4) The shapes and the configurations of the plate-like portion of the heat dissipation member can be altered from those in the above embodiments as appropriate.

(5) The configurations, the materials, the arrangement of the fixing member can be altered from those in the above embodiments as appropriate.

(6) The fixing structures of the fixing member between the light guide plate and the light source board can be altered from those in the above embodiments as appropriate.

(7) In the above embodiments, the liquid crystal display device including the liquid crystal panel as a display panel is used. However, the technology can be applied to display devices including other types of display panels.

(8) In the above embodiments, the television device including the tuner is used. However, the technology can be applied to a display device without a tuner.

The embodiments have been described in detail. However, the above embodiments are only some examples and do not limit the scope of the claimed invention. The technical scope of the claimed invention includes various modifications of the above embodiments.

The technical elements described in this specification and the drawings may be used independently or in combination to achieve the technical benefits. The combinations are not limited to those in claims. With the technologies described in this specification and the drawings, multiple objectives may be accomplished at the same time. However, the technical benefits can be achieved by accomplishing even only one of the objectives.

EXPLANATION OF SYMBOLS

TV: television device, LDU: liquid crystal display unit, PWB: power source board, MB: main board, CTB: control board, CV: cover, ST: stand, UU: integral unit, 10, 210, 310, 410, 510: liquid crystal display device, 11, 211, 311, 411, 511: liquid crystal panel, 12, 212, 312, 412, 512: backlight device, 13, 213, 313, 413, 513: frame, 14, 214, 314, 414, 514: chassis, 15, 215, 315, 415, 515: optical member, 16, 216, 316, 416, 516: light guide plate, 16s: positioning protrusion, 17, 117, 217, 317, 417, 517: LED, 18, 118, 218, 318, 418, 518: LED board, 18a, 118a, 218a, 318a, 418a, 518a: mount surface (of the LED board), 19, 219, 319, 419, 519: heat dissipation member, 19*a*, 219*a*, 319*a*, 419*a*, 519*a*: board attachment portion, 19*b*, 219*b*, 319*b*, 419*b*: plate-like portion, 20, 220, 320, 420, 520: reflection sheet, 21*t*: positioning recess, 30*a*, 30*b*, 130*a*, 130*b*, 230*a*, 230*b*, 330*a*, 330*b*, 430*a*, 430*b*, 530*a*, 530*b*: photo curable resin, 519*b*1: first plate-like portion, 519*b*2: second plate-like portion.

The invention claimed is:

1. A display device comprising:
    a light source;
    a display panel configured to provide a display using light from the light source;
    a light guide plate arranged on an opposite side from a display surface side of the display panel so as to overlap the display panel and configured to direct the light from the light source toward a display panel side, the light guide plate including at least a side surface as a light entrance surface, and a plate surface facing the display panel as a light exit surface;
    a light source board having one plate surface on which the light source is arranged;
    a chassis having at least a bottom plate and arranged on an opposite side of the light guide plate from the display panel side;
    a frame arranged on the display surface side of the display panel and holding the display panel, the light source, and the light guide plate between the frame and the chassis, the frame including a portion that supports the light guide plate from a side of the light exit surface such that the light guide plate slides;
    a fixing member provided between the light source board and the light guide plate and fixed to the light source board and the light guide plate to maintain a distance between the one plate surface of the light source board and the light entrance surface of the light guide plate; and
    a heat dissipation member having a heat dissipation property and arranged apart from the frame, the heat dissipation member including:
        an attachment portion attached on another plate surface of the light source board; and
        a plate-like portion having a plate-like shape extending from the attachment portion toward the light guide plate, the plate-like portion being a plate spring, the plate-like portion including a portion being elastically in contact with the bottom plate.

2. The display device according to claim 1, wherein the distance between the one plate surface of the light source board and the light entrance surface of the light guide plate is maintained by the fixing member such that a light-emitting surface of the light source is in contact with the light entrance surface.

3. The display device according to claim 1, wherein the fixing member is made of a photo curable resin.

4. The display device according to claim 1, wherein the fixing member is a fitting portion extending from the light source board toward the light guide plate and having a hook-like shape, the fitting portion being fitted in a portion of the light guide plate.

5. The display device according to claim 1, wherein the portion of the plate-like portion that is in contact with the bottom plate is provided with a lubricant agent.

6. The display device according to claim 1, wherein the plate-like portion includes at least a portion including the portion that is in contact with the bottom plate, the at least the portion has a curved surface curved so as to be convex toward the bottom plate.

7. The display device according to claim 1, wherein the plate-like portion extends at an angle from a connection portion of the attachment portion so as to be away from the light guide plate and further extends at an angle toward the light guide plate.

8. The display device according to claim 1,
    wherein the one plate surface of the light source board has a rectangular shape, and
    wherein the fixing member is provided to end portions of the one plate surface of the light source board with respect to a short-side direction thereof.

9. The display device according to claim 8,
    wherein the light source board has a rectangular shape, and
    wherein the fixing member is provided substantially over a long-side direction of each of the one plate surface and the light entrance surface.

10. The display device according to claim 8, wherein the fixing member is black in color having a light blocking property.

11. The display device according to claim 1, wherein the light guide plate has a pair of side surfaces on opposite sides as the light entrance surface.

12. The display device according to claim 1,
    wherein one of the light guide plate and the frame includes a protrusion that protrudes toward the other one of the light guide plate and the frame, and
    wherein the other one of the light guide plate and the frame includes a recess located opposite the protrusion, the recess opening to the protrusion such that the protrusion fits therein.

13. The display device according to claim 1, wherein the display panel is a liquid crystal panel.

14. A television device comprising the display device according to claim 1.

* * * * *